US011123165B2

(12) United States Patent
Hansen et al.

(10) Patent No.: US 11,123,165 B2
(45) Date of Patent: Sep. 21, 2021

(54) DENTAL RESTORATION MOLDS

(71) Applicant: 3M INNOVATIVE PROPERTIES COMPANY, St. Paul, MN (US)

(72) Inventors: James D. Hansen, White Bear Lake, MN (US); Joseph C. Dingeldein, Blaine, MN (US); Mary C. Doruff, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/061,350

(22) PCT Filed: Dec. 15, 2016

(86) PCT No.: PCT/US2016/066806
§ 371 (c)(1),
(2) Date: Jun. 12, 2018

(87) PCT Pub. No.: WO2017/106431
PCT Pub. Date: Jun. 22, 2017

(65) Prior Publication Data
US 2018/0360577 A1    Dec. 20, 2018

Related U.S. Application Data

(60) Provisional application No. 62/268,561, filed on Dec. 17, 2015.

(51) Int. Cl.
*A61C 5/85*    (2017.01)
*A61C 13/08*    (2006.01)
*A61C 5/35*    (2017.01)

(52) U.S. Cl.
CPC .............. *A61C 13/081* (2013.01); *A61C 5/35* (2017.02); *A61C 5/85* (2017.02)

(58) Field of Classification Search
CPC ............ A61C 5/35; A61C 5/85; A61C 13/081
(Continued)

(56) References Cited

U.S. PATENT DOCUMENTS

| 613,947 | A | * | 11/1898 | Strout | ...................... A61C 5/85 433/40 |
| 2,090,904 | A | | 7/1933 | Singer | |

(Continued)

FOREIGN PATENT DOCUMENTS

| CN | 204709027 | 10/2015 |
| DE | 10 2009 039 880 | 3/2011 |

(Continued)

OTHER PUBLICATIONS

"Bite-perf: the art of occlusal duplication", [retrieved form the internet on Aug. 8, 2017], URL <www.biteperf.es>, 2pgs.
(Continued)

*Primary Examiner* — James P Mackey

(57) ABSTRACT

A custom tool for forming a dental restoration in a mouth of a patient includes a first mold body providing for a customized fit with at least one tooth of the patient. The first mold body includes a portion corresponding with at least a first surface of the tooth and an interproximal portion corresponding with an interproximal surface of the tooth, the interproximal portion being of unitary construction. The first mold body is configured to combine with the tooth of the patient to form a mold cavity encompassing a first portion of missing tooth structure of the tooth.

38 Claims, 13 Drawing Sheets

(58) Field of Classification Search
USPC .................................. 433/40; 249/54, 55
See application file for complete search history.

(56) References Cited

U.S. PATENT DOCUMENTS

| | | | |
|---|---|---|---|
| 2,674,801 A | | 4/1954 | Trangmar |
| 3,224,050 A | * | 12/1965 | Redtenbacher ........ A61C 13/00 |
| | | | 164/246 |
| 3,482,314 A | | 12/1969 | Tofflemire |
| 4,433,959 A | | 2/1984 | Faunce |
| 4,695,254 A | | 9/1987 | Herrell |
| 4,704,087 A | * | 11/1987 | Dragan .................... A61C 5/85 |
| | | | 433/39 |
| 4,713,005 A | | 12/1987 | Marshall |
| 4,775,320 A | | 10/1988 | Marshall |
| 4,775,430 A | | 10/1988 | Tanaka |
| 4,778,386 A | * | 10/1988 | Spiry ....................... A61C 5/77 |
| | | | 433/223 |
| 4,881,898 A | | 11/1989 | Harvey, Sr. |
| 5,192,207 A | | 3/1993 | Rosellini |
| 5,195,889 A | * | 3/1993 | von Weissenfluh ..... A61C 5/00 |
| | | | 433/40 |
| 5,332,390 A | | 7/1994 | Rosellini |
| 5,382,160 A | | 1/1995 | Shemet |
| 5,487,663 A | | 1/1996 | Wilson |
| 5,803,734 A | | 9/1998 | Knutson |
| 5,890,896 A | * | 4/1999 | Padial .................. A61C 9/0026 |
| | | | 433/214 |
| 6,482,314 B1 | | 11/2002 | Khare |
| 6,659,772 B2 | | 12/2003 | Margeas |
| 6,776,614 B2 | | 8/2004 | Weichmann |
| 6,821,462 B2 | | 11/2004 | Schulman |
| 6,845,175 B2 | | 1/2005 | Kopelman |
| 7,027,642 B2 | | 4/2006 | Rubbert |
| 7,056,115 B2 | | 6/2006 | Phan |
| 7,092,780 B2 | | 8/2006 | Ganley |
| 7,162,321 B2 | | 1/2007 | Luthardt |
| 7,217,131 B2 | | 5/2007 | Vuillemot |
| 7,234,937 B2 | | 6/2007 | Sachdeva |
| 7,236,842 B2 | | 6/2007 | Kopelman |
| 7,442,040 B2 | | 10/2008 | Kuo |
| 7,605,817 B2 | | 10/2009 | Zhang |
| 7,689,310 B2 | | 3/2010 | Kopelman |
| 7,731,495 B2 | | 6/2010 | Eisenberg |
| 7,801,632 B2 | | 9/2010 | Orth |
| 7,956,862 B2 | | 6/2011 | Zhang |
| 8,194,067 B2 | | 6/2012 | Raby |
| 8,255,071 B2 | | 8/2012 | Kaigler, Sr. |
| 8,308,478 B2 | | 11/2012 | Primus |
| 8,359,114 B2 | | 1/2013 | Steingart |
| 8,366,445 B2 | | 2/2013 | Vuillemot |
| 8,393,897 B2 | | 3/2013 | Clark |
| 8,491,306 B2 | | 7/2013 | Raby |
| 8,527,079 B2 | | 9/2013 | Kim |
| 8,696,356 B2 | | 4/2014 | Hegyi |
| 8,753,114 B2 | | 6/2014 | Vuillemot |
| 8,794,965 B2 | | 8/2014 | Latiolais |
| 8,882,497 B2 | | 11/2014 | Frantz |
| 8,909,363 B2 | | 12/2014 | Kopelman |
| 9,308,058 B2 | | 4/2016 | Clark |
| 9,375,290 B2 | | 6/2016 | Csapo |
| 9,414,895 B2 | | 8/2016 | Clark |
| 10,327,873 B2 | | 6/2019 | Fisker |
| 2003/0170593 A1 | | 9/2003 | Dorfman |
| 2004/0029068 A1 | | 2/2004 | Sachdeva |
| 2005/0042577 A1 | | 2/2005 | Kvitrud |
| 2005/0089813 A1 | | 4/2005 | Slone |
| 2005/0089814 A1 | | 4/2005 | Slone |
| 2006/0008777 A1 | | 1/2006 | Peterson |
| 2006/0115792 A1 | | 6/2006 | Vuillemot |
| 2006/0122719 A1 | | 6/2006 | Kopelman |
| 2008/0153069 A1 | | 6/2008 | Holzner |
| 2009/0104581 A1 | | 4/2009 | Simon |
| 2010/0159412 A1 | | 6/2010 | Moss |
| 2011/0212420 A1 | | 9/2011 | Vuillemot |
| 2012/0029018 A1 | | 2/2012 | Lee |
| 2013/0130202 A1 | | 5/2013 | Vuillemot |
| 2013/0325431 A1 | | 12/2013 | See |
| 2014/0205967 A1 | | 6/2014 | Csapo |
| 2015/0057782 A1 | | 2/2015 | Kopelman |
| 2015/0140517 A1 | | 5/2015 | Vuillemot |
| 2015/0182301 A1 | | 7/2015 | Hegland |
| 2015/0250568 A1 | | 9/2015 | Fisker |
| 2016/0015246 A1 | | 1/2016 | Clausen |
| 2016/0089220 A1 | | 3/2016 | Ebert |
| 2016/0143717 A1 | | 5/2016 | Samrano |
| 2016/0262860 A1 | | 9/2016 | Korten |
| 2017/0119499 A1 | | 5/2017 | Clark |
| 2017/0273763 A1 | | 9/2017 | Fisker |
| 2018/0021113 A1 | | 1/2018 | Hansen |
| 2018/0280116 A1 | | 10/2018 | Hansen |
| 2018/0360577 A1 | | 12/2018 | Hansen |
| 2019/0083208 A1 | | 3/2019 | Hansen |
| 2019/0201165 A1 | | 7/2019 | Mishaeloff |
| 2019/0298489 A1 | | 10/2019 | Dingeldein |

FOREIGN PATENT DOCUMENTS

| | | |
|---|---|---|
| DE | 10 2012 108 217 | 12/2013 |
| EP | 2 400 914 | 8/2018 |
| FR | 2 500 294 | 8/1982 |
| FR | 2500294 | 8/1982 |
| JP | 2008-119225 | 5/2008 |
| JP | 2014-171698 | 9/2014 |
| WO | WO 2007-084727 | 7/2007 |
| WO | WO 2009/010543 | 1/2009 |
| WO | WO 2009-042378 | 4/2009 |
| WO | WO 2009-158231 | 12/2009 |
| WO | WO 2011-041193 | 4/2011 |
| WO | WO 2011/156806 | 12/2011 |
| WO | WO 2016/046308 | 3/2016 |
| WO | WO 2016/066552 | 5/2016 |
| WO | WO 2016/094272 | 6/2016 |
| WO | WO 2016/095272 | 6/2016 |
| WO | WO 2017-106419 | 6/2017 |
| WO | WO 2017-106431 | 6/2017 |
| WO | WO 2018/022616 | 2/2018 |
| WO | WO 2018/022617 | 2/2018 |
| WO | WO 2020/033528 | 2/2020 |
| WO | WO 2020/033532 | 2/2020 |
| WO | WO 2020/058855 | 3/2020 |

OTHER PUBLICATIONS

"Bite-pert: Training kit (English)", youtube, [retrieved form the internet on Aug. 8, 2017], URL <http://www.youtube.com/watch?v=tCw45t_ntrA>, 1pg.
3M Oral Care lecture, 2015, 16pgs_.
Conte, "A Clear PVS Matrix Technique for the Placement of Posterior Direct Composites", Dentistry Today, Apr. 30, 2008, 5pgs.
International Search Report for International Application No. PCT/US2016/066806, dated Mar. 22, 2017, 7 pages.
Cavity, Merriam-Webster.com Dictionary, Merriam-Webster, https://www.merriam-webster.com/dictionary/cavity. Accessed Jan. 4, 2021, 14 pages. (2021).

* cited by examiner

DENTAL RESTORATION MOLDS

TECHNICAL FIELD

This disclosure relates to dental restorations.

BACKGROUND

A dental restoration, or a dental filling, utilizes a restorative dental material used to improve function, integrity and morphology of missing or irregular tooth structure. For example, a dental restoration may be used to restore missing tooth structure due to congenital discrepancies, following external trauma, or as part of a restorative treatment for dental caries, or tooth decay.

Restorative dentistry often includes drilling decay from an infected tooth (commonly referred to as "preparing" the tooth) and then using simple tools and a high level of craftsmanship to isolate, retract, fill and contour the finished restoration. Quality isolation via a rubber dam is cumbersome and often skipped for less effective isolation via cotton roles—increasing the risk of contamination which reduces longevity of the restoration. Retraction of soft and hard tissue includes manipulation of cords, wedges and matrix bands, and imperfect technique may result in contamination, difficulty in finishing and/or polishing in interproximal areas, and poorly adapted contacts.

While 'bulk fill' restorative materials and high intensity curing lights facilitate relatively fast filling of deep cavities (e.g., 4-5 mm), many restorations are completed in a single shade as practitioners may be uncertain of the correct layering protocol for multiple shades or types of restorative material. Last, with little geometrical guidance available on a prepared tooth, creation of the final filling level and occlusal surface geometry may include overfilling with restorative dental material, followed by an iterative process of grinding and checking tooth contact and biting function on an anesthetized patient. This process may be the most time consuming for dental restorations and errors here may result in tooth sensitivity and return visits for adjustment.

Commonly-assigned patent application number PCT/US2015/064195, titled, "DENTAL RESTORATION MOLDING TECHNIQUES, filed Dec. 7, 2015, discloses dental restoration techniques incorporating the molding of dental restorative material directly on a tooth located within the mouth of a patient.

SUMMARY

This disclosure relates to dental restoration techniques incorporating the molding of restorative dental material directly on a tooth located within the mouth of a patient. Disclosed techniques include methods for dental restoration, custom tools used for dental restoration and techniques for producing custom tools for dental restoration. Disclosed techniques include tools providing mold cavities customized for an individual patient. In some examples, such custom tools may be produced using 3D printing techniques.

In one example, this disclosure is directed to a custom tool for forming a dental restoration in a mouth of a patient, the custom tool comprising a first mold body providing for a customized fit with at least one tooth of the patient. The first mold body includes a portion corresponding with at least a first surface of the tooth and an interproximal portion corresponding with an interproximal surface of the tooth, the interproximal portion being of unitary construction. The first mold body is configured to combine with the tooth of the patient to form a mold cavity encompassing a first portion of missing tooth structure of the tooth.

In a further example, this disclosure is directed to a custom tool for forming a dental restoration in a mouth of a patient, the custom tool comprising a plurality of first mold bodies providing for a customized fit with a plurality of teeth of the patient that will receive a plurality of dental restorations. The plurality of mold bodies each include a portion corresponding with a first surface of the plurality of teeth and an interproximal portions corresponding with an interproximal surface of the plurality of teeth. The plurality of mold bodies are configured to combine with the plurality of teeth of the patient to form a plurality of first mold cavities encompassing first portions of missing tooth structure of the plurality of teeth.

In another example, this disclosure is directed to a method of forming a dental restoration in a mouth of a patient comprising attaching a first mold body to at least one tooth with missing dental structure. The first mold body provides for a customized fit with the at least one tooth of the patient. The first mold body includes a portion corresponding with at least a first surface of a tooth of the at least one tooth and an interproximal portion corresponding with an interproximal surface of the tooth, wherein attaching the first mold body to the at least one tooth forms a mold cavity encompassing a first portion of missing tooth structure of the tooth. The method further comprises filling the mold cavity with dental restoration material, curing the dental restoration material within the mold cavity to form a first partial dental restoration portion, removing the first mold body from the at least one tooth, and attaching a second mold body to the at least one tooth with missing dental structure. The second mold body provides for a customized fit with the at least one tooth of the patient. The second mold body includes a portion corresponding with a second surface of the tooth. Attaching the second mold body to the at least one tooth forms a mold cavity encompassing a second portion of missing tooth structure of the tooth. The method further comprises filling the mold cavity with dental restoration material, curing the dental restoration material within the mold cavity to form a second partial dental restoration portion, and removing the second mold body from the at least one tooth. The first and second partial dental restoration portions combine to provide the entire missing tooth structure.

In further example, this disclosure is directed to a method of forming a dental restoration in a mouth of a patient comprising attaching a first mold body to the at least one tooth with missing dental structure. The first mold body provides for a customized fit with at least one tooth of the patient. The first mold body includes a portion corresponding with at least a first surface of the tooth. The first mold body is configured to combine with the tooth of the patient to form a mold cavity encompassing a first portion of missing tooth structure of the tooth. The method further comprises attaching a second mold body to the at least one tooth with missing dental structure. The second mold body providing for a customized fit with the at least one tooth of the patient. The second mold body includes a portion corresponding with a second surface of the tooth. The second mold body is configured to combine with the tooth of the patient to form a mold cavity encompassing a second portion of missing tooth structure of the tooth. The method further comprises filling the mold cavity and mold cavity with dental restoration material, curing the dental restoration material within the mold cavity and mold cavity to form a first and second partial dental restoration portion, and removing the first mold body and second mold body from the at least one tooth. The first and second partial dental restoration portions combine to provide the entire missing tooth structure.

In another example, this disclosure is directed to a process of making a custom tool for forming a dental restoration of a tooth within a mouth of a patient, the process comprising, obtaining three dimensional scan data of a patient's mouth, and three-dimensionally printing a custom tool for forming the dental restoration of the tooth based on the three dimensional scan data of the mouth of the patient. The custom tool includes a first mold body providing for a customized fit with at least one tooth of the patient, wherein the first mold body an interproximal portion corresponding with an interproximal surface of the tooth, the interproximal portion being of unitary construction.

In another example, this disclosure is directed to a process of obtaining a custom tool for forming a dental restoration of a tooth within a mouth of a patient, the process comprising obtaining three dimensional scan data of a patient's mouth, transmitting at least a portion of the three dimensional scan data to a remote manufacturing facility, and receiving, from the remote manufacturing facility, a custom tool for forming the dental restoration of the tooth based on the three dimensional scan data of the mouth of the patient. The custom tool includes a first mold body providing for a customized fit with at least one tooth of the patient, wherein the first mold body includes an interproximal portion corresponding with an interproximal surface of the tooth.

In another example, this disclosure is directed to a process of obtaining a custom tool for forming a dental restoration of a tooth within a mouth of a patient, the process comprising obtaining three dimensional scan data of a patient's mouth, transmitting at least a portion of the three dimensional scan data to a remote manufacturing facility, and receiving, from the remote manufacturing facility, a design for a custom tool for forming the dental restoration of the tooth based on the three dimensional scan data of the mouth of the patient. The custom tool includes a first mold body providing for a customized fit with at least one tooth of the patient, wherein the first mold body includes an interproximal portion corresponding with an interproximal surface of the tooth.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS SHOWING SOME EXAMPLES OF THIS DISCLOSURE

DETAILED DESCRIPTION

While conventional dental restoration techniques often include iterative steps and benefit from significant practitioner skill and experience, this disclosure includes techniques that may utilize custom molds to facilitate forming dental restorations within the mouth of a patient more precisely and quickly than generally possible using conventional dental restoration techniques.

Disclosed techniques include capturing a three dimensional dentition of a patient with an intraoral scanner or scanning of a conventional impression or model to produce scan data. The custom tool for a dental restoration may include a mold based on the three dimensional (3D) dentition of the patient. The disclosed techniques may facilitate high quality dental restorations with reduced time and skill requirements as compared to conventional dental restoration techniques.

Figure 1:
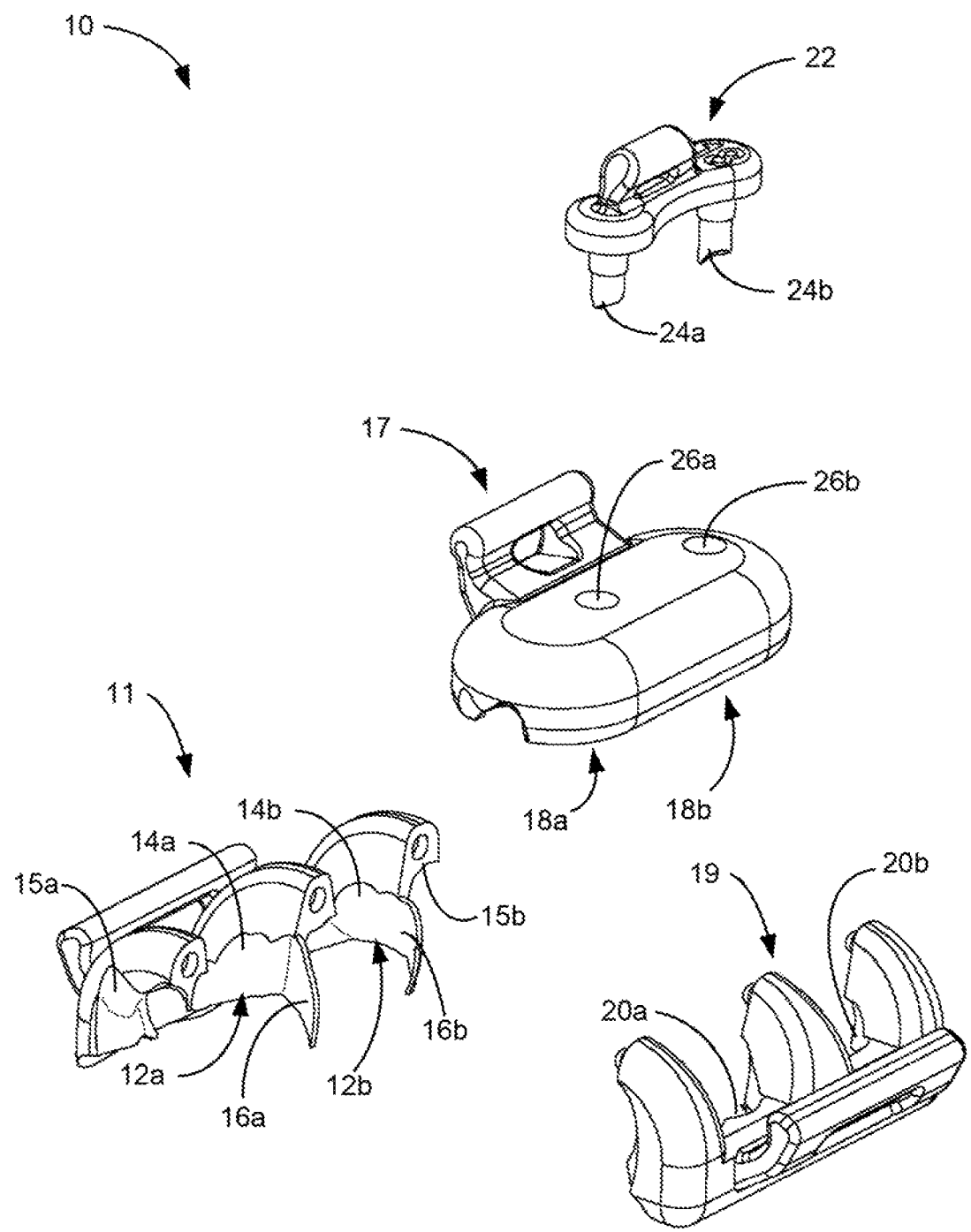
FIGS. 1-4 illustrate a custom tool for forming dental restorations of two adjacent teeth in a mouth of a patient, the custom tool including a mold body with an interproximal portion corresponding with an interproximal surface of a tooth.
Figure 2:
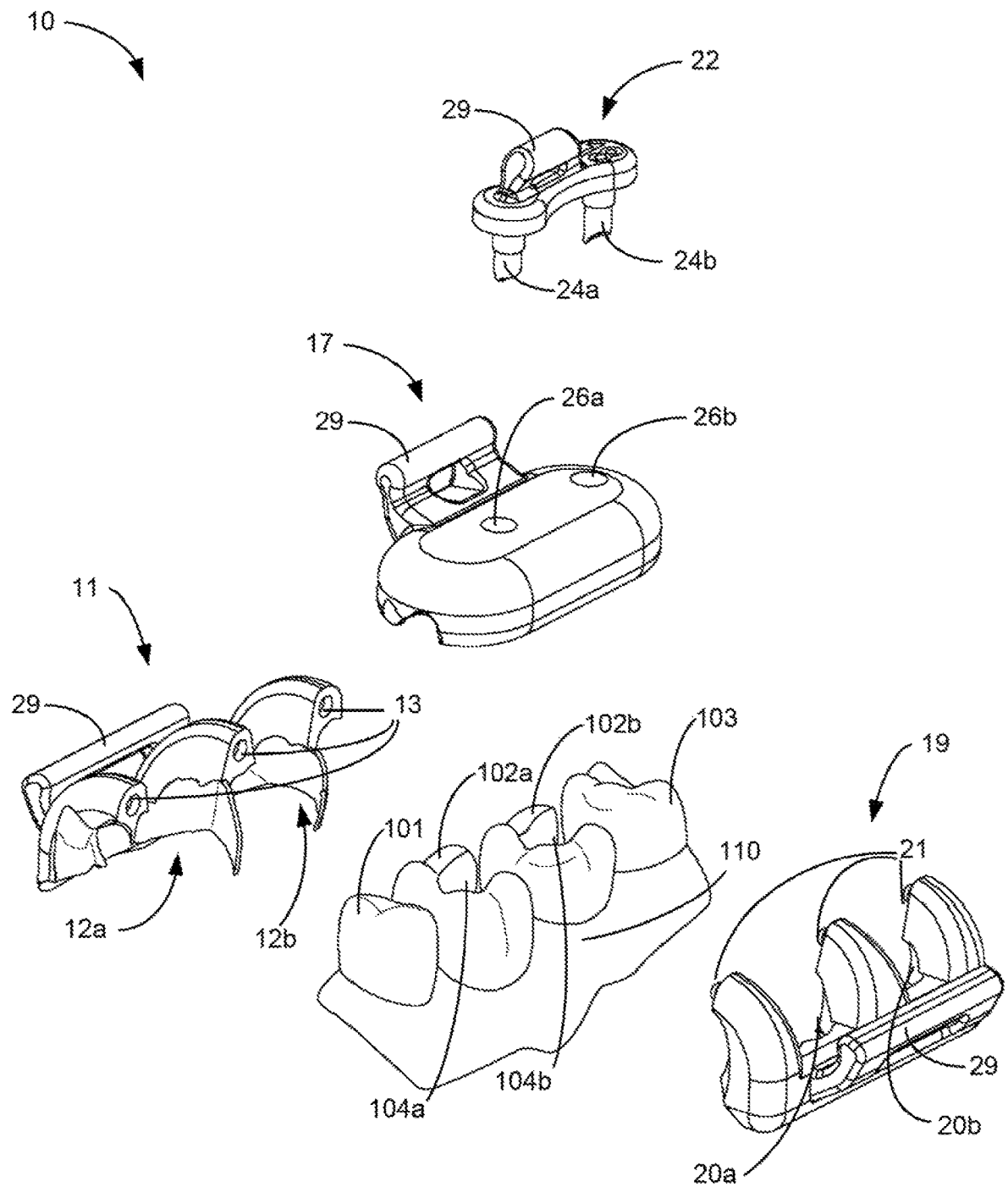
Figure 3:
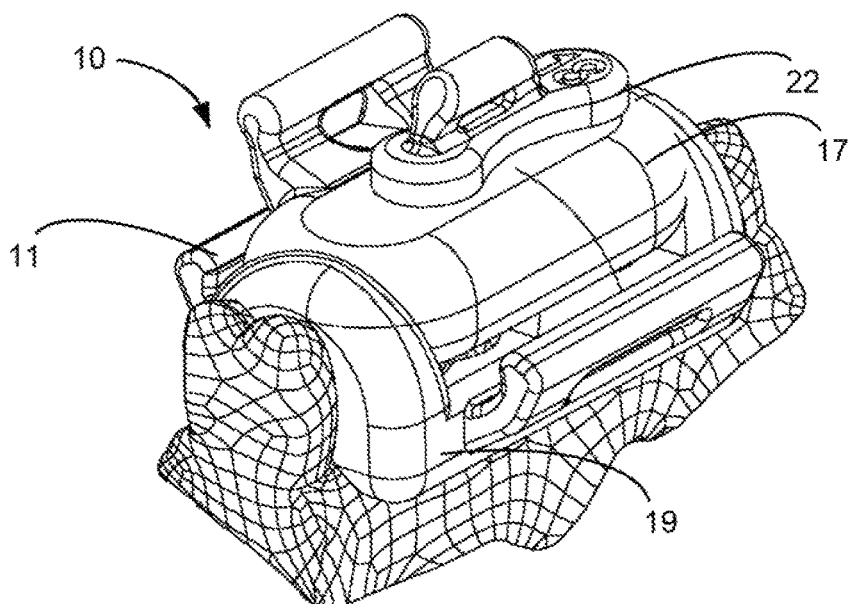
Figure 4:
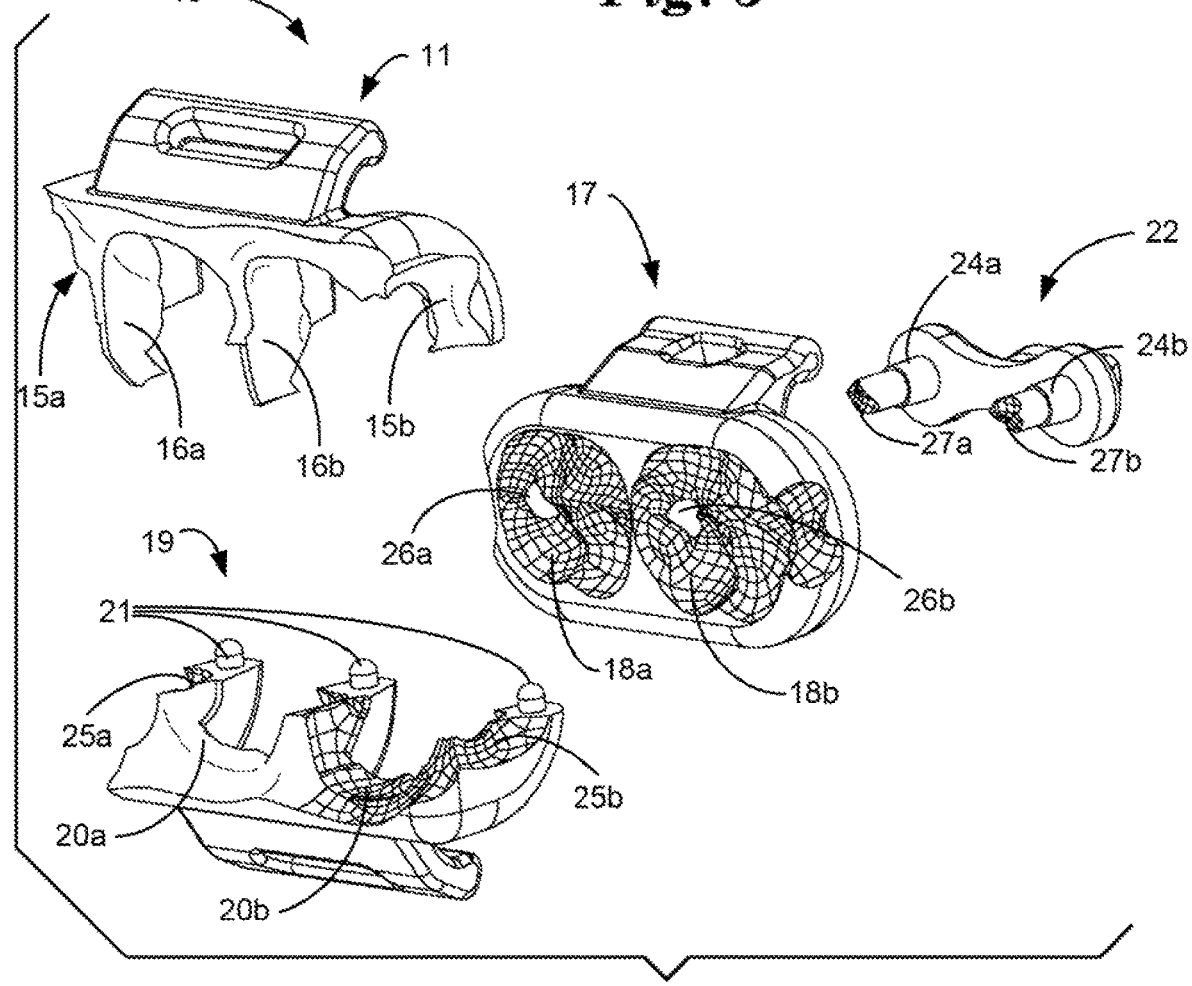

FIGS. 1-4 illustrate custom tool 10 for forming a dental restorations of two adjacent teeth 102a, 102b (collectively, "teeth 102") in a mouth of a patient. In particular, FIG. 1 illustrates the components of custom tool 10, whereas FIG. 2 illustrates the components of custom tool 10 as well as a portion of the mouth of a patient. FIG. 3 illustrates the components of custom tool 10 assembled within the mouth of a patient to facilitate a dental restoration. FIG. 4 illustrates the components of custom tool 10 with surfaces that provide a customized fit within the mouth of the patient visible. While custom tool 10 is configured to facilitate dental restorations of two adjacent teeth, custom tool 10 is merely one example, and the techniques described with respect to custom tool 10 can readily be applied to custom tools that facilitate repair of a single tooth, such as custom tool 410 of FIG. 14, or more than two teeth.

Custom tool 10 includes a unitary mold body component 11, which includes first mold body 12A and second mold body 12B (collectively, "mold bodies 12") with interproximal portions 16A, 16B (collectively, "interproximal portions 16"). Interproximal portions 16 correspond with interproximal surfaces of teeth 102. Other custom tools may include only one mold body or more than two mold bodies to facilitate repair of one tooth or more than two teeth. In addition, custom tools with more than one mold body may include multiple mold body components, e.g., as described with respect to FIGS. 7-9.

Mold bodies 12 each provide a customized fit with at least one tooth of the patient. As shown in FIG. 2, mold body 12a provides a customized fit with tooth 102a, and mold body 12b provides a customized fit with tooth 102b. In particular, portion 14a of mold body 12a provides a customized fit with tooth 102a, and portion 14b of mold body 12b provides a customized fit with tooth 102b. In addition, interproximal portion 16a of mold body 12a corresponds to an interproximal surface of tooth 102a to also provide a customized fit with tooth 102a, and interproximal portion 16b of mold body 12b corresponds to an interproximal surface of tooth 102b to also provide a customized fit with tooth 102b. Interproximal portions 16 are each of unitary construction in that custom tool 10 does not include any seams within its components within the interproximal spaces corresponding to interproximal portions 16a, 16b. For example, interproximal portions 16 may each extend entirely through the interproximal space between the tooth 102 receiving the restoration and an adjacent tooth.

Mold body component 11 further includes optional customized surface 15a, which provides a customized fit with tooth 101 and optional customized surface 15b, which provides a customized fit with tooth 103. Customized surfaces 15a, 15b may further secure and register mold bodies 12 in place within a patient's mouth to facilitate precise customized dental restorations of teeth 102. Mold body component 11 may further register with gingiva 110 of the patient.

Optionally, mold bodies 12 may be further configured to provide features, including customized gingival surfaces representing an isolation matrix for a dental restoration. In this manner, mold bodies 12 may contain features that extend subgingivally or into hidden interproximal space. The data for these extensions can be based off of anatomical averages, or patient 3d data obtained by x-ray, ultrasound, MRI or other means. The tool may incorporate elastomeric material which can be designed for an undersized fit to create a tight seal against varying actual geometry of the patient's dentition. The materials used may also vary in hydrophilicity to draw water, saliva, blood, gingival crevicular fluid, and other fluids away from the tooth structure being restored. Microfluidic channels, vacuum line attachments and bite blocks can be incorporated as well.

The customized fit of mold bodies 12 may further serve to isolate teeth 102 from blood, gingival crevicular fluid, or saliva during a dental restoration material. For example, portions of mold bodies 12 may mate with surfaces of teeth 101, 102, 103 as well as gingiva 110 to shield the mold cavity from bodily fluids such as blood and saliva. In addition, mold bodies 12 may further serve to forcibly retract gingiva 110 and/or separate teeth 101, 102, 103 upon insertion of mold body component 11 within the mouth of the patient. For example, interproximal portions 16 of mold bodies 12 may serve to forcibly separate adjacent teeth. In this manner, while custom tool 10 may be based on a three-dimensional model of the mouth of a patient, various features of custom tool 10 may be selected to temporarily modify the positions of gingiva 110 and/or teeth 101, 102, 103 during a restoration procedure.

Following molding of restorative dental material using mold bodies 12, because interproximal portions 16 of mold bodies 12 extend through the interproximal spaces, the occurrence of raised seams or flashing from restorative dental material within the interproximal spaces should be limited as compared to molds in which seams between mold components exist within the interproximal spaces. As material may be difficult to remove from within interproximal portions 16, the design of custom tool 10 may simplify and improve dental restoration molding techniques as compared to molds in which seams between mold components exist within the interproximal spaces. Further, integration of the interproximal portion, 16 with the mold body component 11 permits fast and easy placement while assuring precise alignment of the components is maintained, which may simplify dental restorations as compared to conventional multi-piece matrix systems.

Custom tool 10 further includes optional support body component 19. Support body component 19 includes first support body 20a and second support body 20b (collectively, "support bodies 20"), which engageable with, and provides support for, mold bodies 12 via snap fit connections. For example, support bodies 20 may not provide any portion of the mold cavities, but may instead simply help secure mold body component 11 including mold bodies 12 in place. Support bodies 20 include snap fit elements 21 that mate with corresponding snap fit elements 13 of mold bodies 12.

Both mold body component 11 and support body component 19 may include surfaces that register with the teeth of the patient, as well as gingiva 110 of the patient. For example, as described above mold body 12a may include features that register with tooth 101 and both of teeth 102 whereas mold body 12b may include features that register with both of teeth 102 and tooth 103. Likewise, support body 20a may include features that register with tooth 101 and both of teeth 102 whereas support body 20b may include features that register with both of teeth 102 and tooth 103. Support body component 19 further includes optional customized surface 25a, which provides a customized fit with tooth 101 and optional customized surface 25b, which provides a customized fit with tooth 103. Customized surfaces 25a, 25b may further secure and register mold bodies 12 in place within a patient's mouth to facilitate precise customized dental restorations of teeth 102. Support body component 19 may further register with gingiva 110 of the patient. In this manner, mold bodies 12 and support bodies 20 may provide multiple customized surfaces that mate with corresponding surfaces of teeth 101, 102, 103 as well as gingiva 110 of the patient. The combination of mold body component 11 and support body component 19 provides a secure fit within the mouth of the patient to precisely align mold bodies 12 with teeth 102 in order to facilitate dental restorations of teeth 102.

While support bodies 20 are described as not forming any portion of mold cavity, in other examples, the support bodies 20 may be readily modified to combine with mold bodies 12 to form one or more mold cavities. In such examples, the modified support bodies 20 should also be considered mold bodies.

Custom tool 10 further includes occlusal portion 17 and press 22. Occlusal portion 17 provides customized occlusal surfaces 18a, 18b (collectively, "occlusal surfaces 18"), corresponding to occlusal surfaces of teeth 102. As used herein, the term "occlusal surface" may refer to the chewing surface of any teeth, including the posterior teeth, as well as incisal surfaces (e.g., incisal edges) of anterior teeth. In this manner, as used herein, the term occlusal surface is not indicative of any particular tooth or teeth. Occlusal portion 17 includes injection ports 26a, 26b (collectively, "ports 26") for delivery of restorative dental material to mold cavities adjacent occlusal surfaces 18.

Occlusal portion 17 includes ports 26 configured to accept injection of a restorative dental material for mold cavities adjacent occlusal surfaces 18. Following the injection of restorative dental material into the mold cavities adjacent occlusal surfaces 18, press 22 may be positioned such that plugs 24a, 24b (collectively, "plugs 24") are positioned within ports 26, respectively. Plugs 24 further includes plug tip surfaces 27a, 27b (collectively, "surfaces 27") providing defined shapes corresponding to the occlusal surfaces of repaired teeth 102. In some examples, plugs 24 may have dissimilar shapes (square, round) to prevent misalignment of press 22 relative to occlusal portion 17. Occlusal portion 17 further may further include includes vent holes (not shown) to allow air and excess dental material to escape the mold cavities as material is injected via fill ports 26 and as press 22 is positioned such that such that plugs 24 fill ports 26, respectively.

Custom tool 10 combines with teeth 102 to form two distinct mold cavities of mold bodies 12. Mold cavities of mold bodies 12 encompass missing tooth structure of teeth 102. By positioning mold body component 11 over teeth 102, restorative dental material may be positioned into the mold cavities and take the form of the missing tooth structure of cavities 104a, 104b (collectively, "cavities 104"). Specifically, mold body 12a is configured to combine with tooth 102a to form a first mold cavity encompassing a first portion of missing tooth structure of tooth 102a. Likewise, mold body 12b is configured to combine with tooth 102b to form a second mold cavity encompassing a first portion of missing tooth structure of tooth 102b.

Repair of teeth 102 occurs by filling the mold cavities with dental restoration material after positioning mold bodies 12 to register with teeth 102. Optionally, the filling material may be applied to the tooth and/or mold cavity prior to positioning mold bodies 12 to register with teeth 102. In such examples, the process of seating the mold body shapes the restorative material into the desired shape. The missing tooth structure may include any portion of teeth 102, including any combination of interproximal, occlusal, facial and/or lingual tooth structure. An inner surface of mold bodies 12 each include a portion of a mold cavity corresponding with at least one exterior surface of the corresponding tooth 102, the at least exterior surface may include facial, lingual, interproximal and/or occlusal surfaces of the corresponding tooth 102. In some examples, the mold cavities may facilitate dental veneer restoration of facial, lingual, interproximal and/or occlusal surfaces of the corresponding tooth 102.

In some examples, the mold cavities of mold bodies 12 may encompass the entirety of the missing tooth structure of teeth 102. In other examples, the mold cavities of mold bodies 12 may encompass less than the entirety of the missing tooth structure of teeth 102, such that further dental restoration steps may occur following the filling of the mold cavities mold bodies 12, e.g., as shown in FIG. 6B.

Occlusal portion 17 includes occlusal surfaces 18, which correspond with the restored occlusal surfaces of teeth 102. In examples in which occlusal surfaces 18 form a portion of a surface of a mold cavity, occlusal portion 17 represents another mold body in addition to mold bodies 12. In some examples, the mold cavities of mold bodies 12 may be further defined by occlusal surfaces 18 of occlusal portion 17 and/or by plug tip surfaces 27 of plugs 24. That is mold bodies 12, occlusal portion 17 and press 22 may combine to define a single mold cavity for each of teeth 102, e.g., as represented by FIG. 3. In such examples, occlusal portion 17 may slideable over mold body component 11 and support body 19 to form the single mold cavity.

Figure 5A:
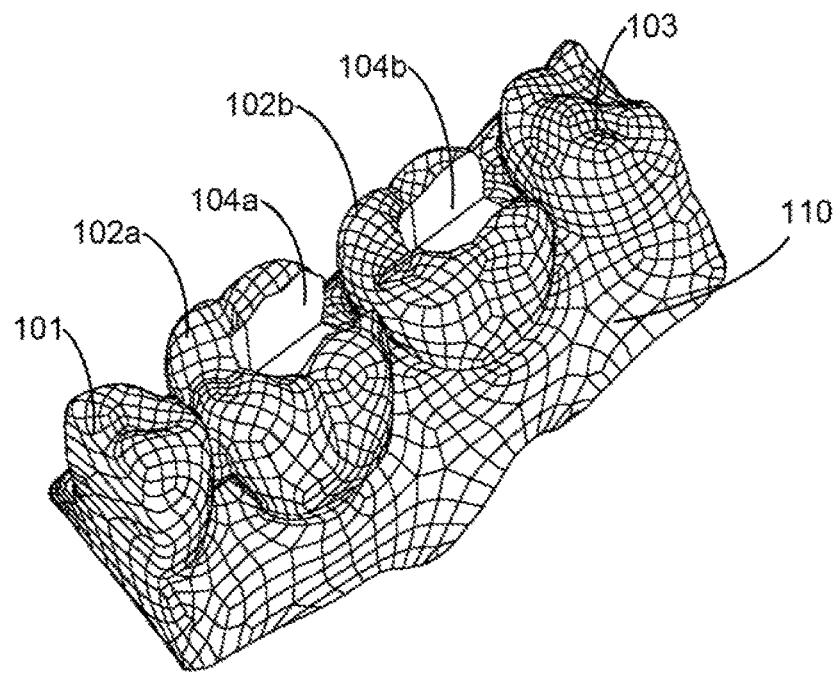
FIGS. 5A-6C illustrate steps for using the custom tool of FIGS. 1-4 to form dental restorations of two adjacent teeth in a mouth of a patient.
Figure 5B:
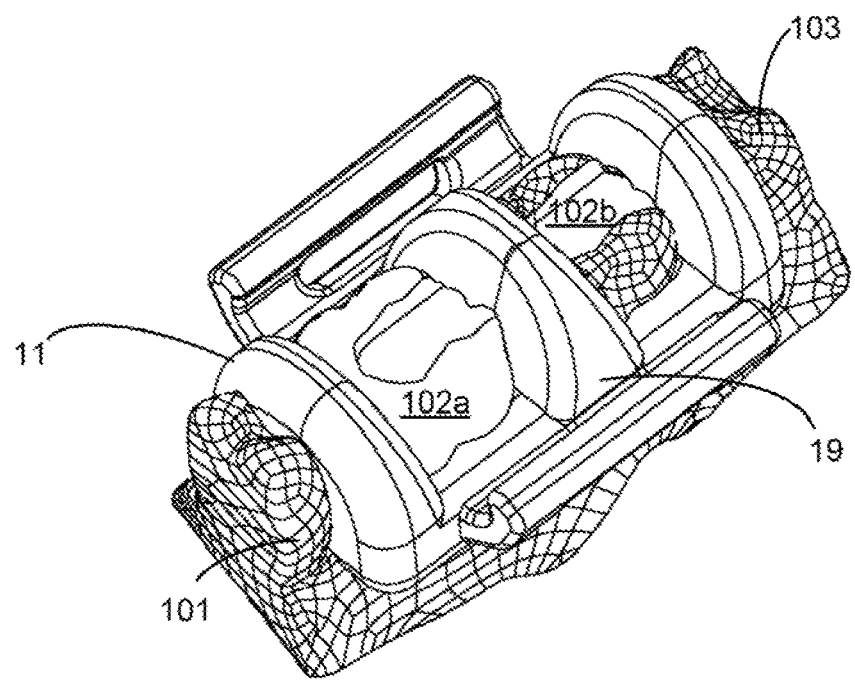
Figure 6A:
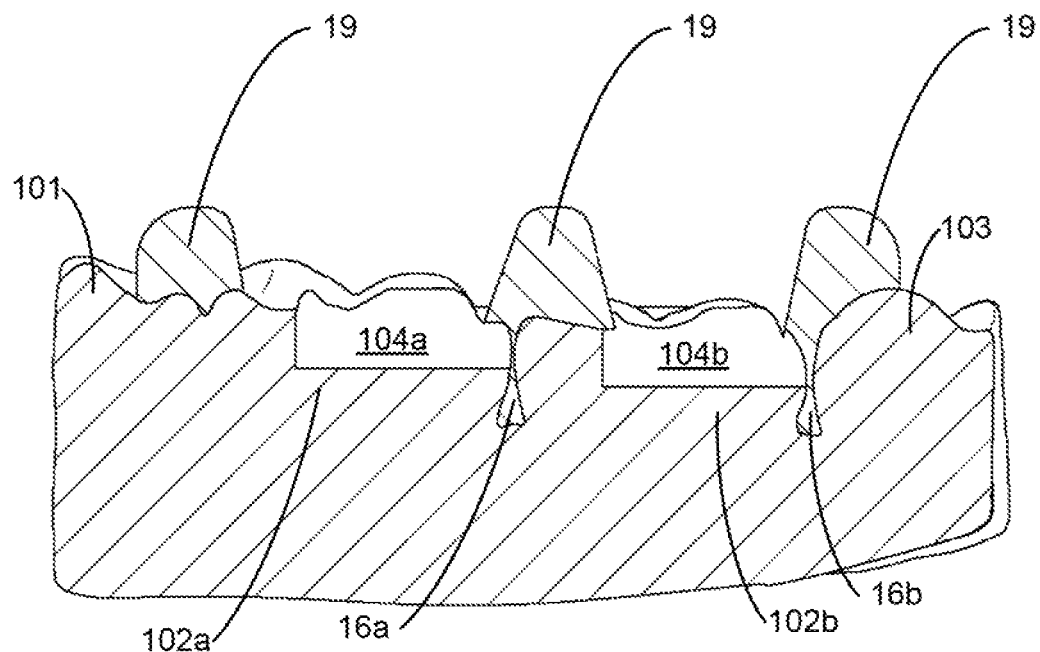
Figure 6B:
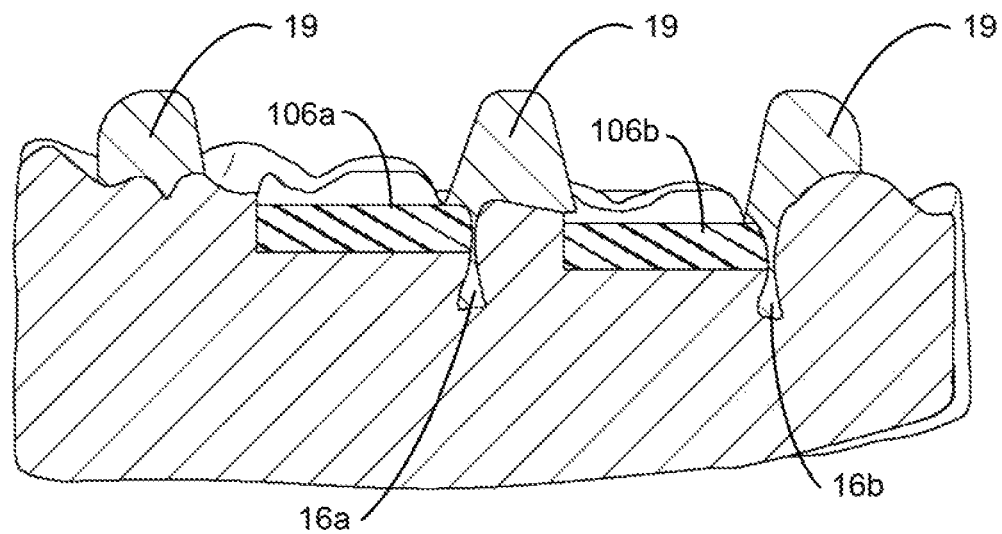

In other examples, as best shown in FIG. 5B, FIG. 6A and FIG. 6B, mold bodies 12 may combine only with the teeth 102 to form the mold cavities associated with mold bodies 12. As shown in FIG. 6B, restorative dental material 106a, 106b (collectively, "restorative dental material 106") within cavities 104 only repairs a portion of the missing tooth material.

Figure 5C:
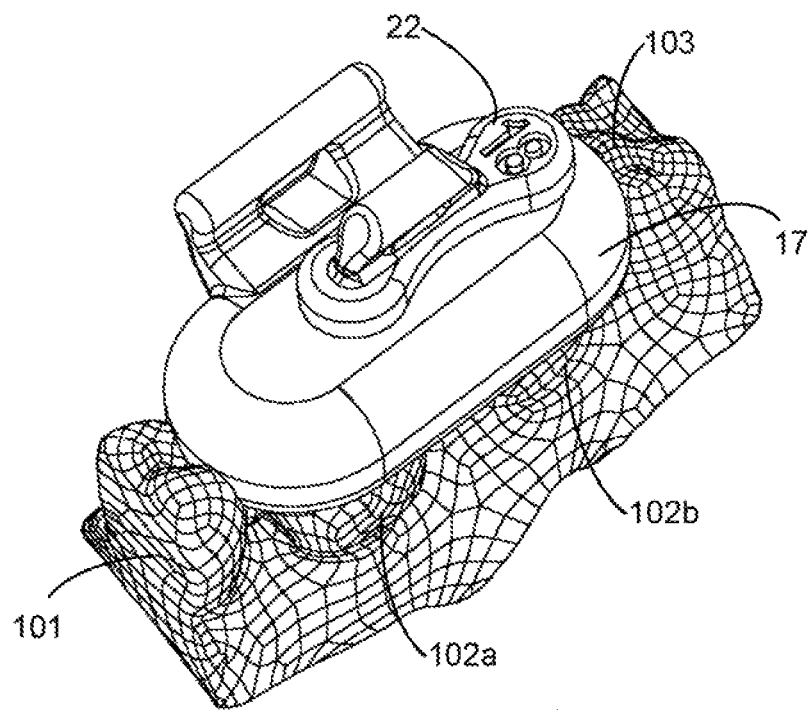
Figure 6C:
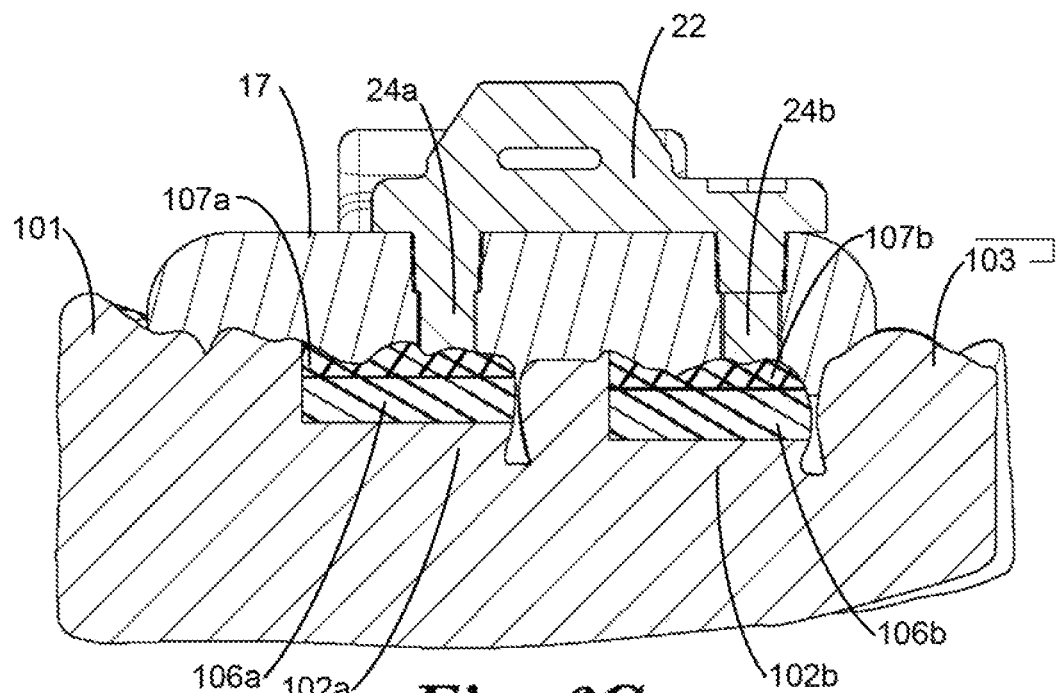

As shown in FIGS. 5C and 6C, following the filling of restorative dental material 106 within cavities 104, occlusal portion 17 and press 22 may be positioned over the partially repaired teeth 102 including restorative dental material 106 to form a second mold cavity for each of teeth 102, which is then filled with restorative dental material 107a, 107b (collectively, "restorative dental material 107"). Occlusal portion 17 and press 22 represent mold bodies as they define mold cavities way of occlusal surfaces 18 and plug tip surfaces 27 respectively.

In this manner, mold body component 11 may provide a first iteration of restorative dental material 106 (as represented in FIGS. 5B and 6B) while occlusal portion 17 and press 22 function as mold bodies to provide a second iteration of restorative dental material 107 (as represented in FIGS. 5C and 6C). Dental restoration material within the first mold cavity and the second mold cavity combines to provide the entire missing structure. The mold cavities of occlusal portion 17 and press 22 may be defined not only by teeth 102, occlusal surfaces 18 of occlusal portion 17 and plug tip surfaces 27 of plugs 24, but also by restorative dental material 106.

Custom tool 10 may be formed based on a digital model of the teeth and mouth of a patient, which can be produced from scan data from an intra-oral 3D scan, such as a multi-channel scanner or the restorative procedure may be shortened by utilizing scan data obtained at a time prior to preparation of the tooth. In one particular example, custom tool 10 may be digitally designed using CAD software, such as solid modeling software based on the digital models of the existing tooth and the desired tooth after restoration. In different examples, the scan data may be obtained recently, such as within the past twelve months, or may be obtained a prior time, such as a period of greater than one year, greater than 5 years or even greater than 10 years ago. Such old scan data may demonstrate tooth wear over time and may facilitate restoration to repair such tooth wear. The scan data from multiple scans over time may also be used to detected tooth wear and facilitate an appropriate restoration.

Custom tool 10 was designed to fit over teeth 102 (which may represent, by way of example, adjacent first and second molars) and a portion of the neighboring teeth 101, 103. Subsequently, the tooth structure of teeth 101, 102, 103 may be digitally subtracted from a mold block, as well as filling ports 26 and optional venting ports. Alternatively, an inverse of the tooth structure may be inverted within software to define the mold block. Filling ports 26 may be located in regions of the occlusal section which correspond to regions of the teeth which would ultimately be removed in the preparation process, e.g., adjacent to the mold cavities of teeth 102. Filling ports 26 may be sized to receive a tip of a commercially available restorative dental material compule, to permit injection of the restorative dental material during filling. Vent ports may be sized smaller in diameter than the filling ports and may be strategically located to assure proper venting, complete fill of the cavity and/or to provide visual indication of the progress of the filling process.

Within the digital model, the mold block design may be segmented into three sections (mold body component 11, support body component 19, and occlusal portion 17) to facilitate eventual assembly of the tool components on the teeth without geometric interference. Alternatively, additional segments may be provided such that portions of the mold for teeth 102 may be separated such that each of mold body component 11, support body component 19 and occlusal portion 17 are divided into two or more components, e.g., as described with respect to FIGS. 7-9. Within the digital model, handle features 29 may be included added to mold body component 11, support body component 19, occlusal portion 17 and/or press 22 to facilitate holding of the portions with a hemostat or cotton pliers during dental restoration using tool 10.

Within the digital model, the occlusal portion 17 may include tabs or sliders on the lingual and facial (buccal) side to provide precise alignment to mold body component 11 and support body component 19. In addition, press 22 may designed to mate with the occlusal section of teeth 102 as well as plug the filling ports 26, in such a manner that the plug tips surfaces 27a, 27b, may be at, or slightly occlusal to, the desired occlusal surface of the restoration of teeth 102.

The components within the CAD software may be converted into a 3D point mesh file or other format to facilitate production with a 3D printer, CNC mill, CAD/CAM milling processes, or otherwise. Orientation marks (e.g., a colored mark on the distal ends of each tool component) may be applied to the tool components to facilitate assembly. Production may optionally include other steps such as, curing (e.g., in a UV oven), cleaning, e.g., in alcohol solution, and/or assembly of various components, polishing of mold surfaces that will form tooth restorations, coating, such as with a clear acrylic to enhance visibility of the restoration area during injection of the restorative dental material. In addition, surfaces of tool components expected to be in contact with the restorative dental material could optionally be coated with a layer of release agent (e.g., a thin layer of petroleum jelly).

FIGS. 5A-5C illustrate steps for using the custom tool 10 to form dental restorations of teeth 102 in a mouth of a patient. Similarly, FIGS. 6A-6C illustrate cross-sectional views of steps for using the custom tool 10 to form dental restorations of teeth 102.

FIG. 5A illustrates a portion of the mouth of the patient that includes teeth 101, 102, and 103 as well as gingiva 110. Tooth 102a includes cavity 104a in the crown of tooth 102a, and tooth 102b includes cavity 104b in the crown of tooth 102b. As shown, cavities 104 may have been caries previously prepared for the dental restoration by removing unhealthy or otherwise undesired tooth structure, e.g., by drilling or other preparation to remove damaged dental material to facilitate dental restoration using tool 10. In some examples a 3D image of the mouth of the patient may be taken prior to the removal of decayed material from teeth 102 as the shape of the decayed material may help in the design of custom tool 10.

An example restoration process for teeth 102 using custom tool 10 is described as follows. As shown in FIGS. 5B and 6A, mold body component 11, including mold bodies 12 is positioned in place over teeth 102 such that interproximal portions 16 extend between teeth 102, 103. Support component 19 is also positioned in place over teeth 102 and snap fit to mold body component 11. The assembled mold body component 11 and support component 19 provides a customized and secure placement within the mouth of the patient. In various examples, depending on the design of custom tool 10, mold body component 11 may be positioned on the lingual or facial sides of teeth 102, with support component 19 on the opposing side of teeth 102.

As best illustrated in FIG. 6B, restorative dental material 106 is positioned within the mold cavities formed by teeth 102 and mold bodies 12. Because the tooth preparations may prepared at a depth greater than the recommended maximum cure depth for the restorative dental material or a dentist desires to shade the inner portion of a restoration differently from the outer portion, a base layer of restorative dental material can optionally be layered into the deep portions of the preparation and restorative dental material photocured, e.g., with an XL 3000 curing light. The components of tool 10 that form mold cavities, including mold body component 11 and occlusal portion 17, and, optionally, support component 19 and press 22, may be transparent to facilitate photocuring. In such examples, restorative dental material 106 represents more than one layer of restorative dental material.

In any event, following the formation of restorative dental material 106 within mold cavities formed by teeth 102 and mold bodies 12, mold body component 11 and support component 19 are removed from the mouth of the patient. Then, as represented by FIGS. 5C and 6C, another mold body, occlusal portion 17 is placed over teeth 102 and restorative dental material 106 to form a second mold cavity for each of teeth 102. The second mold cavity overlaps the first mold cavity and is bounded by restorative dental material 106, occlusal surfaces 18 of occlusal portion 17, plug tip surfaces 27 of plugs 24, and, surfaces of unrepaired portions of teeth 102. Surfaces of occlusal portion 17 may correspond with surfaces of teeth 101, 102, 103 as well as surfaces of restorative dental material 106. In this manner, the surfaces of occlusal portion 17 may be configured to register directly with portions of restorative dental material 106 as defined by surfaces of the mold cavities of mold bodies 12.

Then, as illustrated in FIG. 6C, restorative dental material 107 is added to the mold cavities via ports 26. A mold line between restorative dental material 106 and restorative dental material 107 may be located outside the interproximal spaces such that flash or raised seams may be easily removed during subsequent finishing of the restoration. The final increment of restorative dental material may be formed to the desired anatomy by injecting the restorative dental material via a compule tip through the filling ports 26 while visually monitoring the filling process through occlusal portion 17, in examples in which occlusal portion 17 is transparent, or through filling ports 26 and/or through optional vent ports in occlusal portion 17 in other examples. After filling, the removable press 22 was mated with occlusal portion 17. The final increment of restorative dental material for both teeth 102 may be photocured through tool 10, with the occlusal portion 17 and the removable press 22 in place.

After curing, occlusal portion 17 may be removed from the mouth of the patient and to provide shaped restoration including well-formed contacts on the occlusal surfaces of teeth 102 as provided by occlusal surfaces 18 of occlusal portion 17, as well as well-defined interproximal surfaces as provided by interproximal portions 16 of mold bodies 12. Following the removal of occlusal portion 17, flashed (excess) restorative dental material may be removed, for example, with a dental scalar. Because interproximal portions 16 of mold bodies 12 extend through the interproximal spaces, the occurrence of raised seams or flashing from restorative dental material within the interproximal spaces should be limited as compared to molds in which seams between mold components exist within the interproximal spaces. As material may be difficult to remove from within interproximal portions 16, the design of custom tool 10 may simplify and improve dental restoration molding techniques as compared to molds in which seams between mold components exist within the interproximal spaces.

Figure 7:
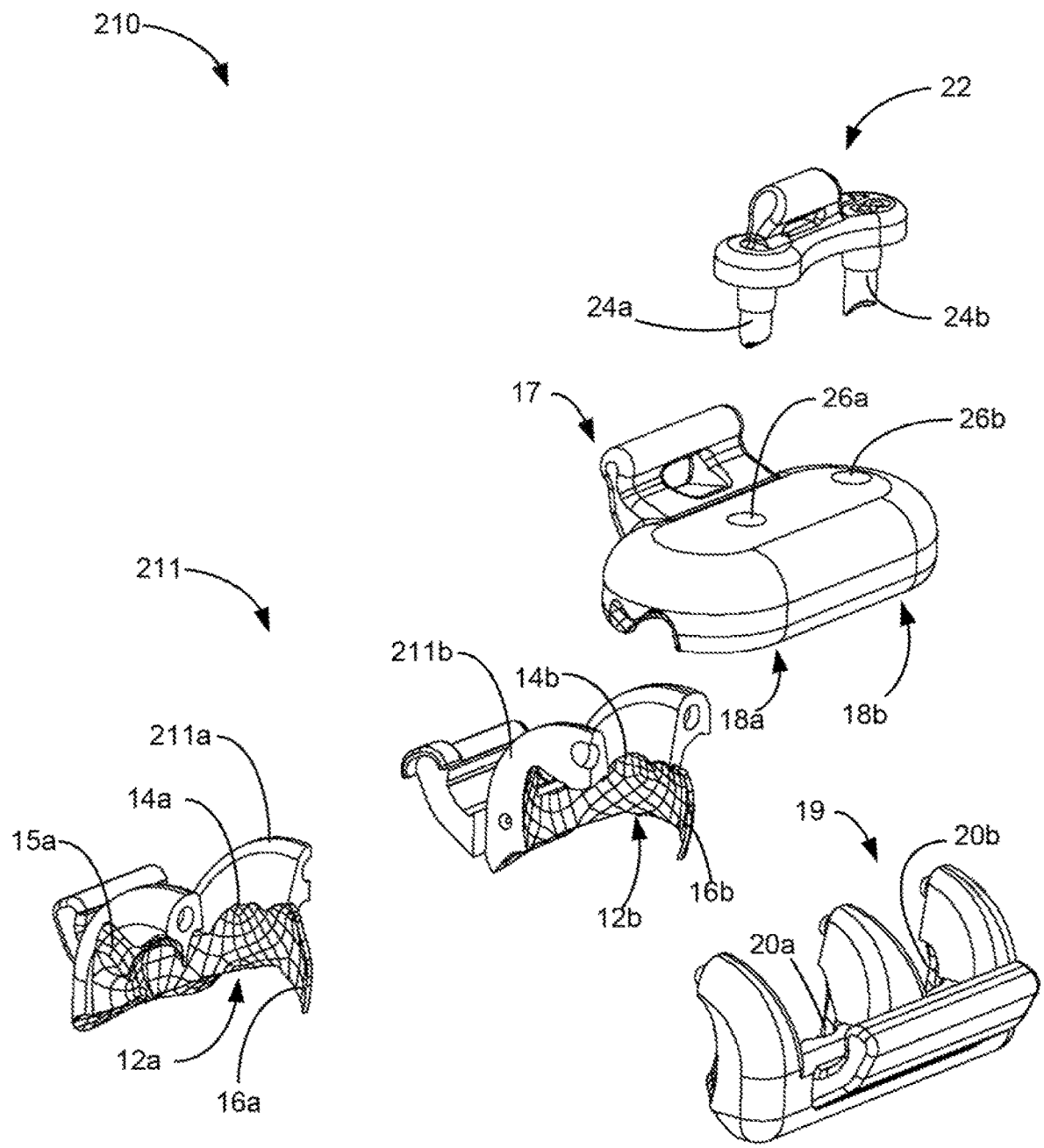
FIGS. 7-9 illustrate an alternative custom tool for forming dental restorations of two adjacent teeth in a mouth of a patient, the custom tool including two mold body components, each mold body component including an interproximal portion corresponding with an interproximal surface of a tooth.
Figure 8:
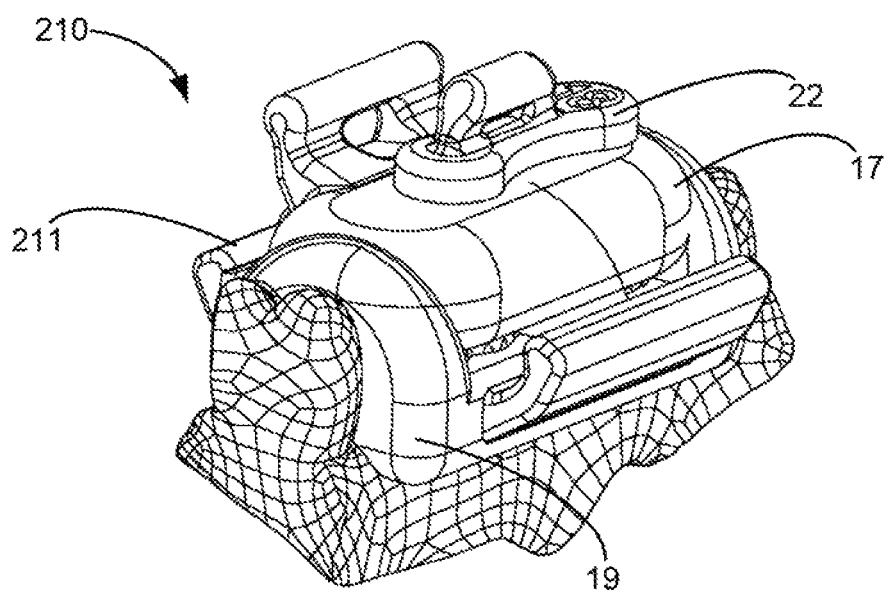
Figure 9:
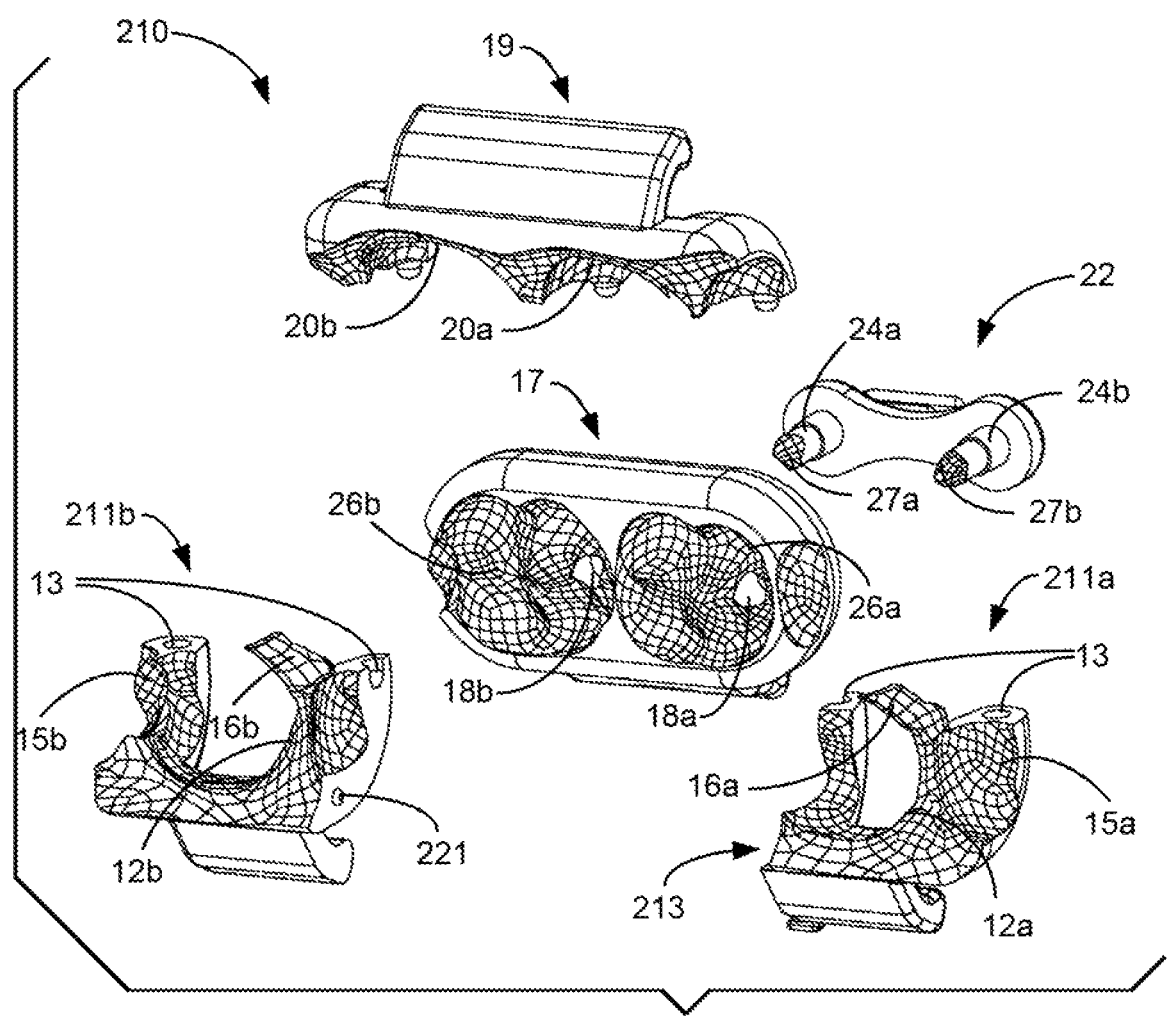

FIGS. 7-9 illustrate an alternative custom tool 210 for forming dental restorations of teeth 102. Custom tool 210 is substantially similar to custom tool 10 except that mold body components 211A, 211B (collectively, "mold body components 211") are substituted for mold body component 11. Where the same numbered reference numbers for elements of custom tool 210 are used as with custom tool 10, these elements are substantially similar to one another. For brevity, such elements are described in limited or no detail with respect to custom tool 210.

Mold body component 211A includes first mold body 12A, customized surface 15a, which provides a customized fit with tooth 101, and divot 213. Similarly, mold body component 211B includes second mold body 12B, customized surface 15b, which provides a customized fit with tooth 103, and protrusion 221 which is configured to register with divot 213 of mold body component 211A to facilitate mating of mold body components 211 within the mouth of a patient. Mold body components 211 may include additional elements to facilitate their mating to provide proper positioning mold bodies 12 within the mouth of a patient.

As described with respect to custom tool 10, interproximal portions 16 of mold bodies 12 correspond with interproximal surfaces of teeth 102. Other custom tools may include only one mold body or more than two mold bodies to facilitate repair of one tooth or more than two teeth. In addition, custom tools with more than one mold body may include multiple mold body components, e.g., as described with respect to FIGS. 7-9.

Mold bodies 12 each provide a customized fit with at least one tooth of the patient. As shown in FIG. 2, mold body 12a provides a customized fit with tooth 102a, and mold body 12b provides a customized fit with tooth 102b. In particular, portion 14a of mold body 12a provides a customized fit with tooth 102a, and portion 14b of mold body 12b provides a customized fit with tooth 102b. In addition, interproximal portion 16a of mold body 12a corresponds to an interproximal surface of tooth 102a to also provide a customized fit with tooth 102a, and interproximal portion 16b of mold body 12b corresponds to an interproximal surface of tooth 102b to also provide a customized fit with tooth 102b. Interproximal portions 16 are each of unitary construction in that custom tool 210 does not include any seams within its components within the interproximal spaces corresponding to interproximal portions 16a, 16b. For example, interproximal portions 16 may each extend entirely through the interproximal space between the tooth 102 receiving the restoration and an adjacent tooth.

Mold body components 211 further includes optional customized surface 15a, which provides a customized fit with tooth 101 and optional customized surface 15b, which provides a customized fit with tooth 103. Customized surfaces 15a, 15b may further secure and register mold bodies 12 in place within a patient's mouth to facilitate precise customized dental restorations of teeth 102. Mold body components 211 may further register with gingiva 110 of the patient.

In this manner, custom tool 210 is functionally similar to custom tool 10. However, the separation of mold bodies 12 including interproximal portions 16 may facilitate easier positioning within the mouth of a patient, particularly for examples in which a custom tool include mold cavities for more than two teeth. For example, positioning interproximal portions 16 within the interproximal spaces may prove difficult in some examples. By separating mold bodies 12 within mold body components 211, each mold body 12 with an interproximal portion 16 may be independently manipulated by a practitioner to fit within the interproximal space of a patient. Thus, for some patient mouth geometries, mold body components 211 of custom tool 210 may be easier to position and remove from the mouth of a patient than mold body component 11 of custom tool 10. Further, this concept of registering subsequent mold bodies to one another may be extended to additional iterations, such that up to an entire dental arch may be restored via a series of self-registering mold bodies.

Figure 10:
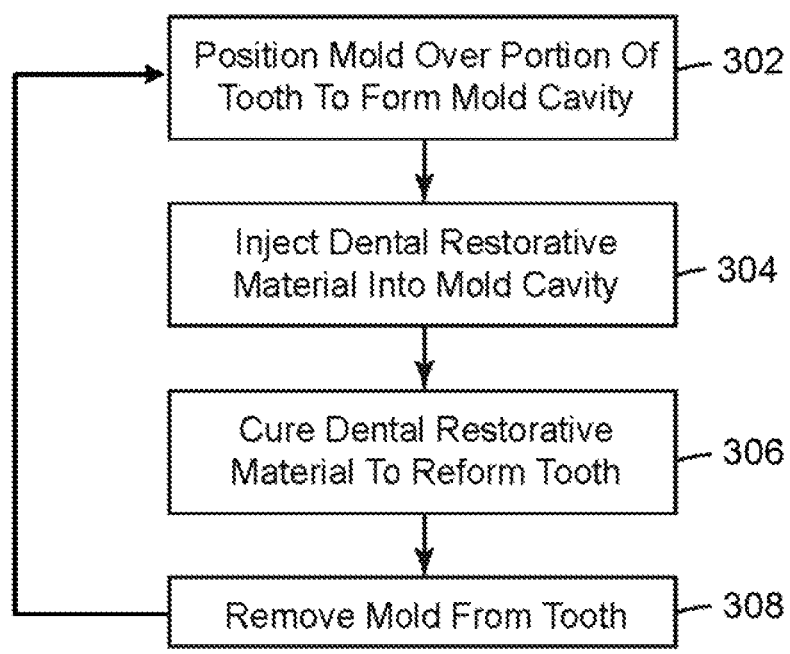
FIG. 10 is a flowchart illustrating an example technique for forming a dental restoration in a mouth of a patient.

FIG. 10 is a flowchart illustrating an example technique for forming a dental restoration in a mouth of a patient. First, a practitioner positions a mold, such as mold bodies 12, occlusal portion 17 and optionally support body component 19, over a portion of a tooth of the patient (302). The tooth either contains missing tooth structure or has been prepared to create missing tooth structure, such as is commonly done in the caries removal process. The mold combines with the tooth to form a mold cavity encompassing missing tooth structure of the tooth. Next a practitioner injects a restorative dental material within the mold cavity (304). The practitioner allows the restorative dental material to cure within the mold cavity to reform the tooth, which may include application of actinic radiation to cure the restorative dental material (306). The practitioner removes the mold from the tooth of the patient leaving the dental restoration with a shape defined by the mold cavity on the tooth of the patient (308). Optionally, the practitioner may repeat the process with an additional mold body, such as occlusal portion 17 to iteratively repair missing tooth material.

Figure 11:
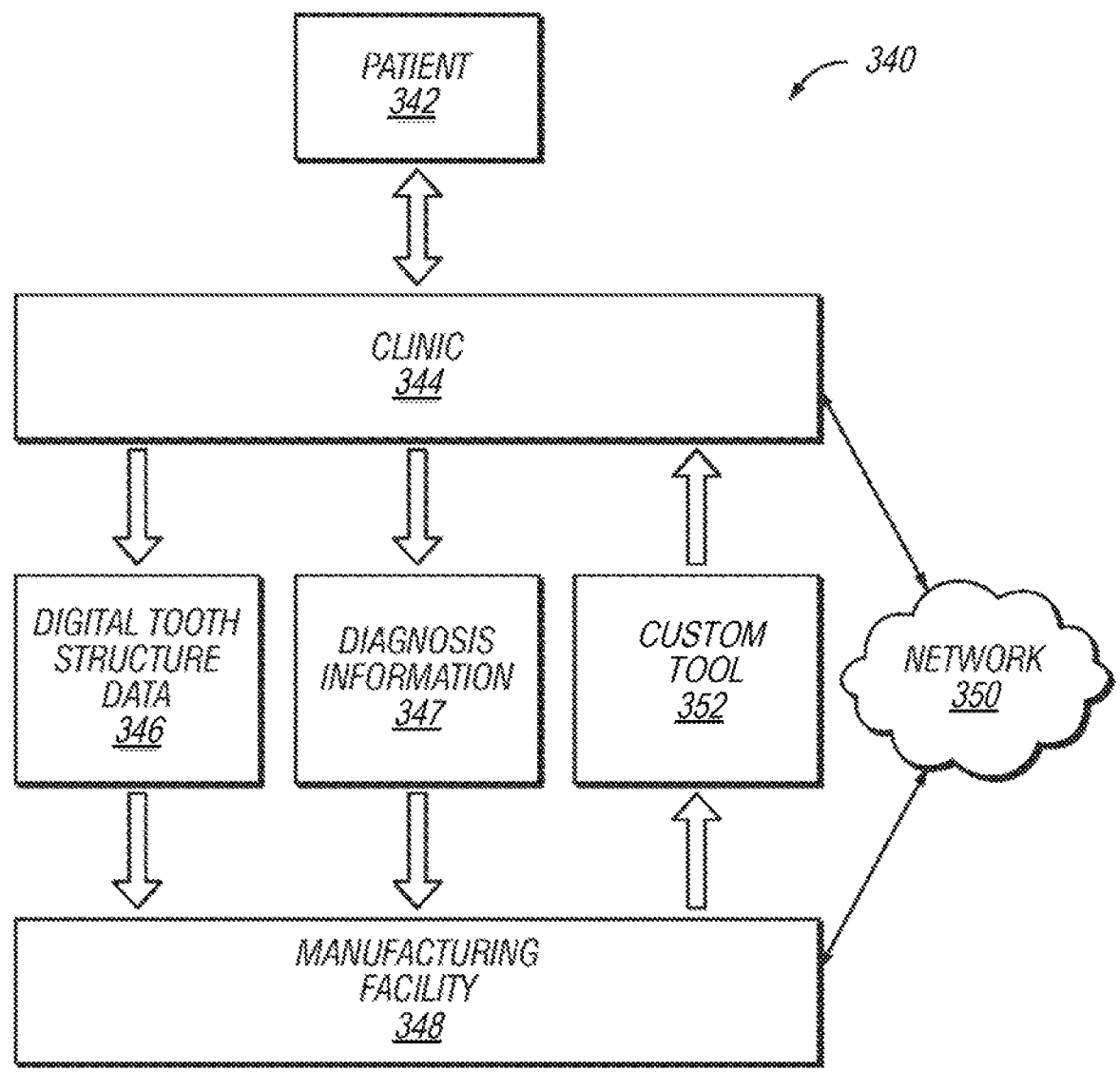
FIG. 11 is a block diagram illustrating an example computer environment in which a clinic and manufacturing facility communicate information throughout a custom tool manufacturing process.

FIG. 11 is a block diagram illustrating an example computer environment 340 in which clinic 344 and manufacturing facility 348 communicate information throughout a manufacturing process of custom tool 10 for patient 342. Initially, an dental practitioner of clinic 344 generates one or more images of a dental structure of patient 342 using any suitable imaging technique and generates digital dental structure data 346 (e.g., a digital representation of patient's 342 tooth structure and, optionally, mouth tissues such as gingiva 110). For example, the practitioner may generate X-RAY images that can be digitally scanned. Alternatively, the practitioner may capture digital images of the patient tooth structure using, for example, conventional computed tomography (CT), laser scanning, intra-oral scanning, CT scans of dental impressions, scans of dental casts poured from impressions, ultrasound instrumentation, magnetic resonance imaging (MM), or any other suitable method of 3D data acquisition. In other embodiments, the digital images may be provided using a hand-held intra-oral scanner such as the intra-oral scanner using active wavefront sampling developed by Brontes Technologies, Inc. (Lexington, Mass.) and described in PCT Publication No. WO 2007/084727 (Boerjes, et al.), which is incorporated by reference herein. Alternatively, other intra-oral scanners or intra-oral contact probes may be used. As another option, the digital structure data 346 may be provided by scanning a negative impression of the patient's teeth. As still another option, the digital structure data 346 may be provided by imaging a positive physical model of the patient's teeth or by using a contact probe on a model of the patient's teeth. The model used for scanning may be made, for example, by casting an impression of a patient's dentition from a suitable impression material such as alginate or polyvinylsiloxane (PVS), pouring a casting material (such as dental stone or epoxy resin) into the impression, and allowing the casting material to cure. Any suitable scanning technique may be used for scanning the model, including those described above. Other possible scanning methods are described in U.S. Patent Publication No. 2007/0031791 (Cinader et al.), which is incorporated by reference herein.

In addition to providing digital images by scanning the exposed surfaces of the teeth, it is possible to image hidden features of the dentition, such as the roots of the patient's teeth and the patient's jaw bones. In some embodiments, the digital tooth structure data is formed by providing several 3D images of these features and subsequently "stitching" them together. These different images need not be provided using the same imaging technique. For example, a digital image of teeth roots provided with a CT scan may be integrated with a digital image of the teeth crowns provided with an intraoral visible light scanner. Scaling and registering of 2D dental images with 3D dental images is described in U.S. Pat. No. 6,845,175 (Kopelman, et al.), which is incorporated by reference herein, and U.S. Patent Publication No. 2004/0029068 (Badura et al.), which is also incorporated by reference herein. Issued U.S. Pat. No. 7,027,642 (Imgrund et al.), which is incorporated by reference herein, and U.S. Pat. No. 7,234,937 (Sachdeva, et al.), which is also incorporated by reference herein, describe using techniques of integrating digital images provided from various 3D sources. Accordingly, the term "imaging" as it is used herein is not limited to normal photographic imaging of visually apparent structures, but includes imaging of dental structures that are hidden from view. The dental structure may include, but is not limited to, any portion of crowns and/or roots of one or more teeth of a dental arch, gingiva, periodontal ligaments, alveolar bone, cortical bone, implants, artificial crowns, bridges, veneers, dentures, dental appliances, or any structure that could be considered part of the dentition before, during, or after treatment.

In order to generate digital tooth structure data 346, a computer must transform raw data from the imaging systems into usable digital models. For example, for raw data representing the shapes of teeth received by a computer, the raw data is often little more than a point cloud in 3D space. Typically, this point cloud is surfaced to create 3D object models of the patient's dentition, including one or more teeth, gingival tissue, and other surrounding oral structure. In order for this data to be useful in dental diagnosis and treatment, the computer may "segment" dentition surfaces to produce one or more discrete, movable 3D tooth object models representing individual teeth. The computer may further separate these tooth models from the gingiva into separate objects. Segmentation allows a user to characterize and manipulate the teeth arrangement as a set of individual objects.

After generating digital dental structure data 346, clinic 344 may store digital dental structure data 346 within a patient record in a database. Clinic 344 may, for example, update a local database having a plurality of patient records. Alternatively, clinic 344 may remotely update a central database (optionally within manufacturing facility 348) via network 350. After digital tooth structure data 346 is stored, clinic 344 electronically communicates digital dental structure data 346 to manufacturing facility 348. Alternatively, manufacturing facility 348 may retrieve digital dental structure data 346 from the central database.

Clinic 344 may also forward treatment data 347 conveying general information regarding a practitioner's diagnosis and treatment plan for patient 342 to manufacturing facility 348. In some examples, treatment data 347 may be more specific. For example, digital dental structure data 346 may be a digital representation of the dental structure of patient 342, and the practitioner of clinic 344 may review the digital representation and indicate desired repairs, including locations for veneers, crowns or fillings for individual teeth of patient 342 prior to forwarding digital dental structure data 346 to manufacturing facility 348. The doctor and manufacturing facility may also engage in an iterative process to arrive at the proper treatment plan. Such interactions may be facilitated by digital communication such as via the Treatment Management Portal offered by 3M Oral Care. Manufacturing facility 348 may be located off-site, or located with clinic 344.

For example, each clinic 344 may include its own equipment for manufacturing facility 348 such that a treatment plan and digital design may be performed entirely by a clinical practitioner, or an assistant, in the clinical setting, using software installed locally. The manufacturing may be performed in the clinic, as well, by using a 3D printer (or by other methods of additive manufacturing). In other examples, a remote manufacturing facility may process the three dimensional scan data of a patient and produce a digital model of a design for a custom tool for forming the dental restoration of the tooth based on the three dimensional scan data of the mouth of the patient. The remote manufacturing facility may then return the digital model of a design for a custom tool for forming the dental restoration of the tooth to the clinic 344.

A 3D printer allows manufacturing of intricate features of a custom tool or a physical representation of the dental structure of patient 342 through additive printing. The 3D printer may use iterative digital designs of original dental structure of patient 342 as well as a desired dental structure of patient 342 to produce multiple custom tools and/or custom tool patterns customized to produce the desired dental structure of patient 342. Manufacturing may include post-processing to remove uncured resin and remove support structures, or to assemble various components, which may also be necessary and could also be performed in a clinical setting. Alternatively, manufacturing can be performed by subtractive manufacturing, such as CAD/CAM mills.

Figure 12:
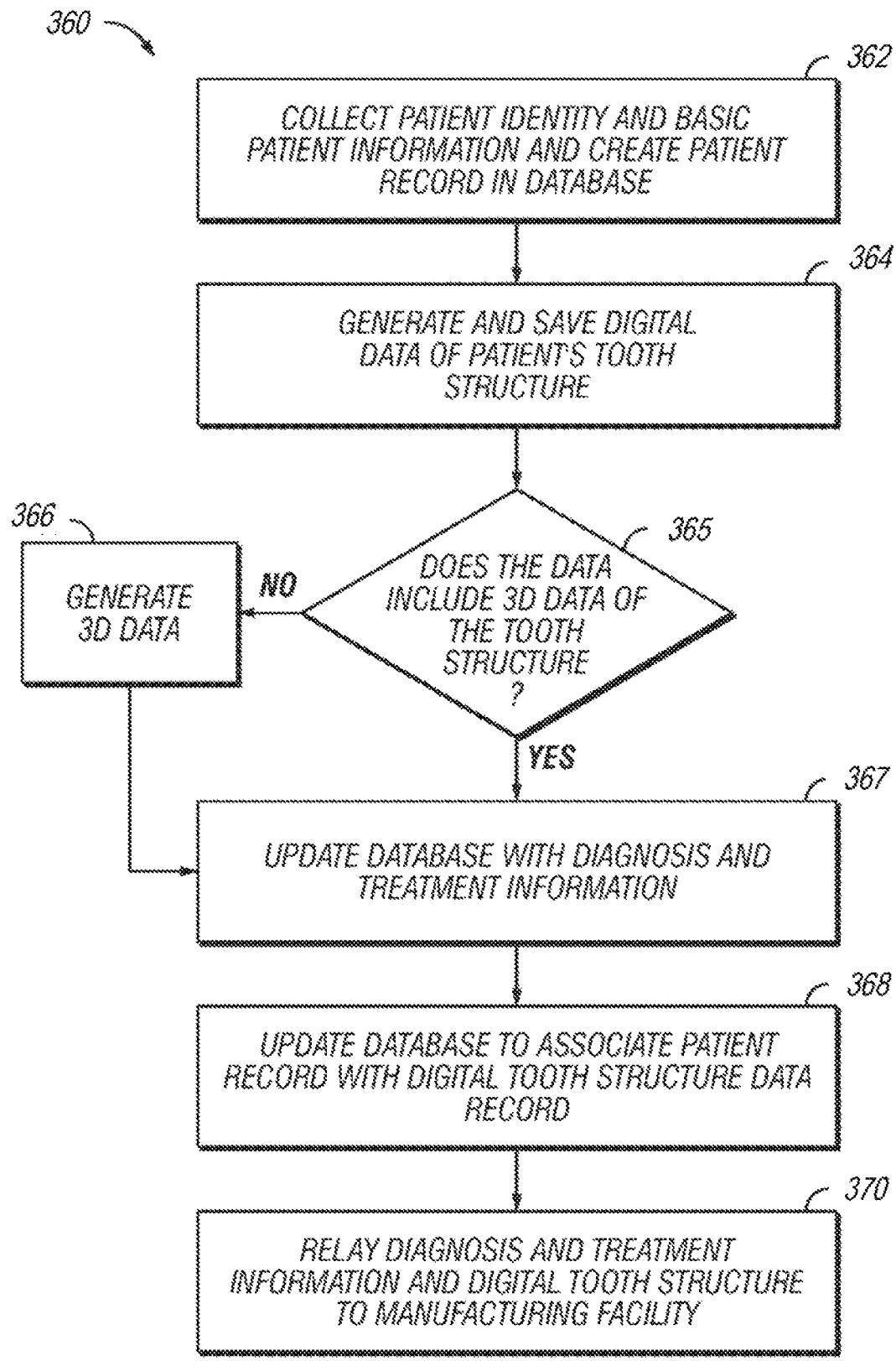
FIG. 12 is a flow diagram illustrating a process conducted at the clinic in accordance with one example of this disclosure.

Manufacturing facility 348 utilizes digital dental structure data 346 of patient 342 to construct custom tool 10 in order to repair teeth of patient 342. Sometime thereafter, manufacturing facility 348 forwards custom tool 10 to clinic 344. FIG. 12 is a flow diagram illustrating process 360 conducted at clinic 344 in accordance with one example of this disclosure. Initially, a practitioner at clinic 344 collects patient identity and other information from patient 342 and creates a patient record (362). As described, the patient record may be located within clinic 344 and optionally configured to share data with a database within manufacturing facility 348. Alternatively, the patient record may be located within a database at manufacturing facility 348 that is remotely accessible to clinic 344 via network 350 or within a database that is remotely accessible by both manufacturing facility 348 and clinic 344.

Next, digital data 346 of the dental structure of patient 342 may be generated using any suitable technique (364), to thereby create a virtual dental structure. Digital data 346 may be comprised of a two-dimensional (2D) image and/or a three-dimensional (3D) representation of the dental structure.

In one example, 3D representations of a dental structure are generated using a cone beam computerized tomography (CBCT) scanner, such as an i-CAT 3D dental imaging device, which is available from Imaging Sciences International, LLC; 1910 N Penn Road, Hatfield, Pa. Clinic 344 stores the 3D data 346 (in the form of radiological images) generated from the CBCT scanner in the database located within clinic 344, or alternatively, within manufacturing facility 348. The computing system processes the digital data 346 from the CBCT scanner, which may be in the form of a plurality of slices, to compute a digital representation of the tooth structure that may be manipulated within the 3D modeling environment.

If 2D radiological images are used (365), then the practitioner may further generate 3D digital data (366). The 3D data 346 may be produced by, for example, forming and subsequently digitally scanning a physical impression or casting of the tooth structure of patient 342. For example, a physical impression or casting of teeth of patient 342 may be scanned using a visible light scanner, such as an OM-3R scanner available from Laser Design, Inc. of Minneapolis, Minn. Alternatively, the practitioner may generate the 3D data 346 of the occlusal service by use of an intra-oral scan of the teeth of patient 342, or existing 3D tooth data. In one example, the method of forming a digital scan from a casting or an impression described in U.S. Pat. No. 8,491,306, titled, "REGISTERING PHYSICAL AND VIRTUAL TOOTH STRUCTURES WITH PEDESTALS," and issued on Jul. 23, 2013, may be used. U.S. Pat. No. 8,491,306 is herein incorporated by reference in its entirety. In the same or different examples, techniques for defining a virtual tooth surface and virtual tooth coordinate system as described in U.S. Patent Application Publication No. 2013/0325431, titled DENTAL DIGITAL SETUPS," and published on Dec. 5, 2013 may be used. U.S. Patent Application Publication No. 2013/0325431 is herein incorporated by reference in its entirety. In any case, the digital data are digitally registered within the 3D modeling environment to form a composite digital representation of a tooth structure, which may include the tooth roots as well as the occlusal surfaces.

In one example, 2D radiological images and the 3D digital data for the occlusal surface of the teeth are registered by first attaching registration markers (e.g., fiducial markers or a pedestal having known geometry) to the tooth structure of patient 342 prior to generating both the radiological images and the 3D digital scan. Thereafter, the digital representation of the registration markers within the 2D radiological image and the 3D digital data may be aligned within a 3D modeling environment using registration techniques described in U.S. Pat. No. 8,491,306.

In another example, 3D digital data of the tooth structure is generated by combining two 3D digital representations of the tooth structure. For example, a first 3D digital representation may be a relatively low resolution image of the roots obtained from a CBCT scanner (e.g., an i-CAT 3D dental imaging device) and the second 3D digital representation may be a relatively high resolution image of the crowns of the teeth obtained from an industrial CT scan of an impression or a visible light (e.g., laser) scan of a casting of the teeth of the patient. The 3D digital representations may be registered using a software program that enables the 3D representations to be manipulated within a computer environment (e.g., Geomagic Studio software, available from 3D Systems, Inc.; 333 Three D Systems Circle, Rock Hill, S.C.), or alternatively, registration techniques described in U.S. Pat. No. 8,491,306 may be used.

Next, a computer system executing 3D modeling software renders a resultant digital representation of the tooth structure, including the occlusal surface, and, optionally, the root structure of the patient's teeth. Modeling software may provide a user interface that allows the practitioner to manipulate digital representations of the teeth in 3D space relative to the digital representation of the patient's teeth. By interacting with the computer system, the practitioner generates treatment information, such as by selecting areas of repair of the teeth of patient 342 (367).

Once the practitioner has finished conveying general information regarding a diagnosis and treatment plan within the 3D environment, the computer system updates the database associated with the patient record to record the treatment data 347 conveying general information regarding a diagnosis and treatment plan as specified by the practitioner (368). Thereafter, the treatment data 347 is relayed to manufacturing facility 348 in order for manufacturing facility 348 to construct one or more custom tools, such as custom tool 10 (370).

Although described with respect to an dental practitioner located at an dental clinic, one or more of the steps discussed with respect to FIG. 12 may be performed by a remote user, such as a user located at manufacturing facility 348. For example, the dental practitioner may only send radiological image data and an impression or casting of the patient to manufacturing facility 348, where a user interacts with a computer system to develop a treatment plan within a 3D modeling environment. Optionally, a digital representation of the treatment plan within the 3D modeling environment may then be transmitted to the dental practitioner of clinic 344, who may review the treatment plan and either send back his or her approval, or indicate desired changes. An additional option would be for the manufacturing facility to create the digital design of the tool which is then returned to the clinic for production on system in the clinic (e.g. 3D printer or mill).

Figure 13:
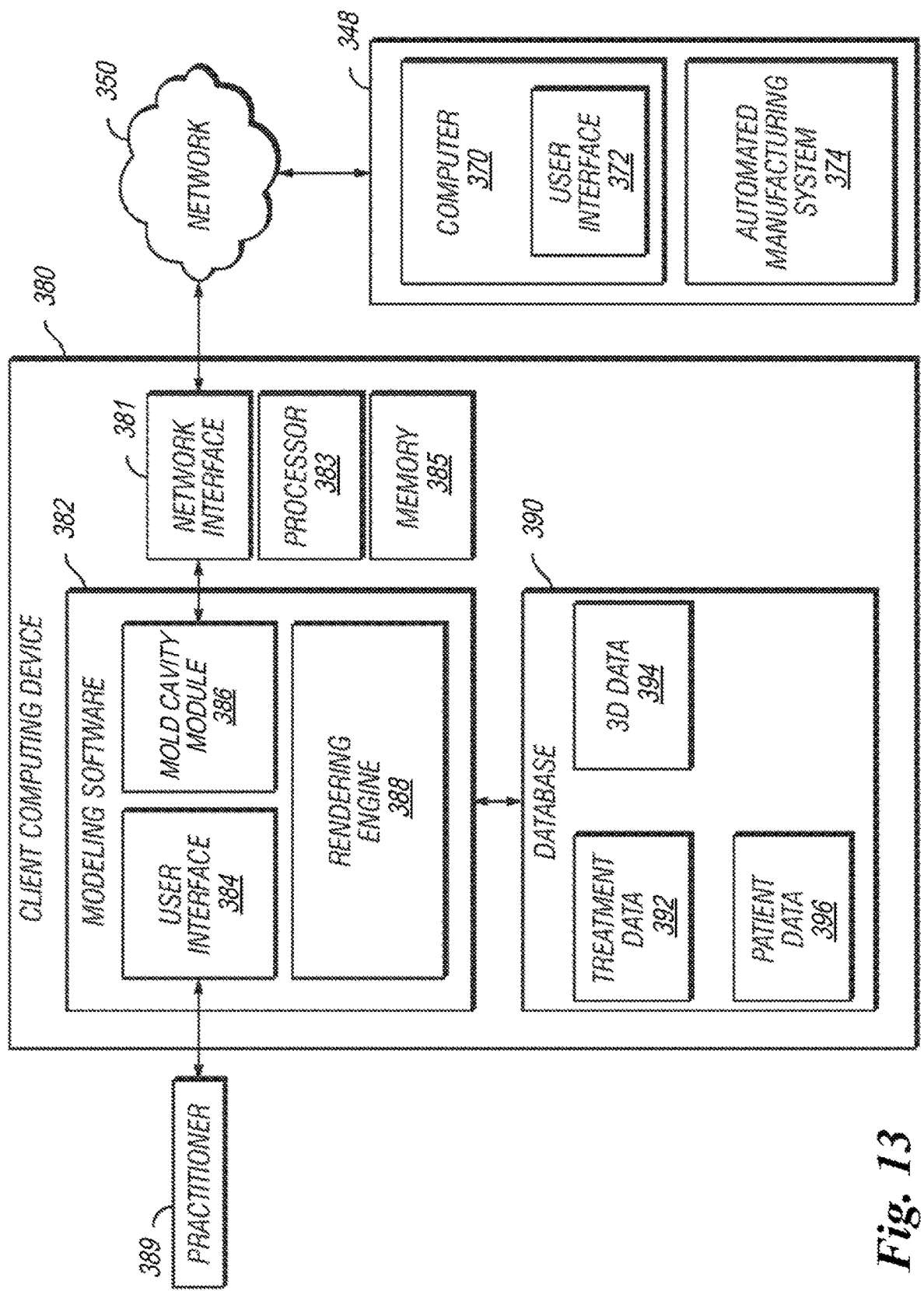
FIG. 13 is a block diagram illustrating an example of a client computing device connected to a manufacturing facility via a network.

FIG. 13 is a block diagram illustrating an example of a client computing device 380 connected to manufacturing facility 348 via network 350. In the illustrated example, client computing device 380 provides an operating environment for modeling software 382. Modeling software 382 presents a modeling environment for modeling and depicting the 3D representation of the teeth of patient 342. In the illustrated example, modeling software 382 includes user interface 384, mold cavity module 386, and rendering engine 388.

User interface 384 provides a graphical user interface (GUI) that visually displays the 3D representation of patient 342'*s* teeth. In addition, user interface 384 provides an interface for receiving input from practitioner 389 of clinic 344 (FIG. 11), e.g., via a keyboard and a pointing device, for manipulating patient 342's teeth within the model, e.g., to select portions for repair, and/or adjust the surfaces of a mold cavity that define the exterior repaired surface of patient 342's teeth as provided by custom tool 10.

Modeling software 382 may be accessible to manufacturing facility 348 via network interface 381. Modeling software 382 interacts with database 390 to access a variety of data, such as treatment data 392, 3D data 394 relating to the tooth structure of patient 342, and patient data 396. Database 390 may be represented in a variety of forms including data storage files, lookup tables, or a database management system (DBMS) executing on one or more database servers. The database management system may be a relational (RDBMS), hierarchical (HDBMS), multi-dimensional (MDBMS), object oriented (ODBMS or OODBMS) or object relational (ORDBMS) database management system. The data may, for example, be stored within a single relational database, such as SQL Server from Microsoft Corporation. Although illustrated as local to client computer device 380, database 390 may be located remote from the client computing device and coupled to the client computing device via a public or private network, e.g., network 350.

Treatment data 392 describes a diagnosis and or repair information of the teeth of patient 342 selected by practitioner 389 and positioned within the 3D modeling environment.

Patient data 396 describes a set of one or more patients, e.g., patient 342, associated with practitioner 389. For example, patient data 396 specifies general information, such as a name, birth date, and a dental history, for each patient.

Rendering engine 388 accesses and renders 3D data 394 to generate the 3D view presented to practitioner 389 by user interface 384. More specifically, 3D data 394 includes information defining the 3D objects that represent each tooth (optionally including roots), and jaw bone within the 3D environment. Rendering engine 388 processes each object to render a 3D triangular mesh based on viewing perspective of practitioner 389 within the 3D environment. User interface 384 displays the rendered 3D triangular mesh to practitioner 389, and allows practitioner 389 to change viewing perspectives and manipulate objects within the 3D environment.

U.S. Pat. No. 8,194,067, titled, "PLANAR GUIDES TO VISUALLY AID DENTAL APPLIANCE PLACEMENT WITHIN A THREE-DIMENSIONAL (3D) ENVIRONMENT," issued on Jun. 5, 2012, and U.S. Pat. No. 7,731,495, titled, "USER INTERFACE HAVING CROSS SECTION CONTROL TOOL FOR DIGITAL DENTALS," issued on Jun. 8, 2010, describe other examples for computer systems and 3D modeling software having user interfaces that may be used with the techniques described herein, each of which are incorporated by reference in their entireties.

Client computing device 380 includes processor 383 and memory 385 in order to store and execute modeling software 382. Memory 385 may represent any volatile or non-volatile storage elements. Examples include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include non-volatile storage, such as a hard-disk, magnetic tape, a magnetic or optical data storage media, a compact disk (CD), a digital versatile disk (DVD), a Blu-ray disk, and a holographic data storage media.

Processor 383 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, memory 385 may store program instructions (e.g., software instructions) that are executed by processor 383 to carry out the techniques described herein. In other examples, the techniques may be executed by specifically programmed circuitry of processor 383. In these or other ways, processor 383 may be configured to execute the techniques described herein.

Client computing device 380 is configured to send a digital representation of a 3D tooth structure of a patient, and optionally, treatment data 392 and/or patient data 396 to computer 370 of manufacturing facility 348 via network 350. Computer 370 includes user interface 372. User interface 372 provides a GUI that visually displays the 3D representation of the digital model of teeth. In addition, user interface 372 provides an interface for receiving input from a user, e.g., via a keyboard and a pointing device, for manipulating a patient's teeth within the digital representation of the 3D tooth structure of the patient.

Computer 370 may further be configured to determine dimensions and shapes a custom tool, the dimensions and shapes of the custom tool being configured to provide one or more mold bodies and mold cavities repair the one or more teeth of the patient. Computer 370 may provide the dimensions and shapes of the custom tool to automated manufacturing system 374 for production of the custom tool.

Client computing device 380 and computer 370 are merely conceptual representations of an example computer system. In some examples, the functionalities described with respect to of client computing device 380 and/or computer 370 may be combined into a single computing device or distributed among multiple computing devices within a computer system. For example, cloud computing may be used for digital design of custom tools described herein. In one example, the digital representations of tooth structures are received at one computer at the clinic, while a different computer, such as computer 370, is used to determine the shapes and dimensions of a custom tool. In addition, it may not be necessary for that different computer, such as computer 370, to receive all of the same data in order for it to determine shapes and dimensions. Shapes and dimensions may be determined, at least in part, based on knowledge derived through analysis of historical cases or virtual models of exemplary cases, without receiving a complete 3D representation of the case in question. In such an example, data transmitted between client computing device 380 and computer 370, or otherwise utilized to design a custom tool may be significantly less than the complete data set representing a complete digital dental model of a patient.

Figure 14:
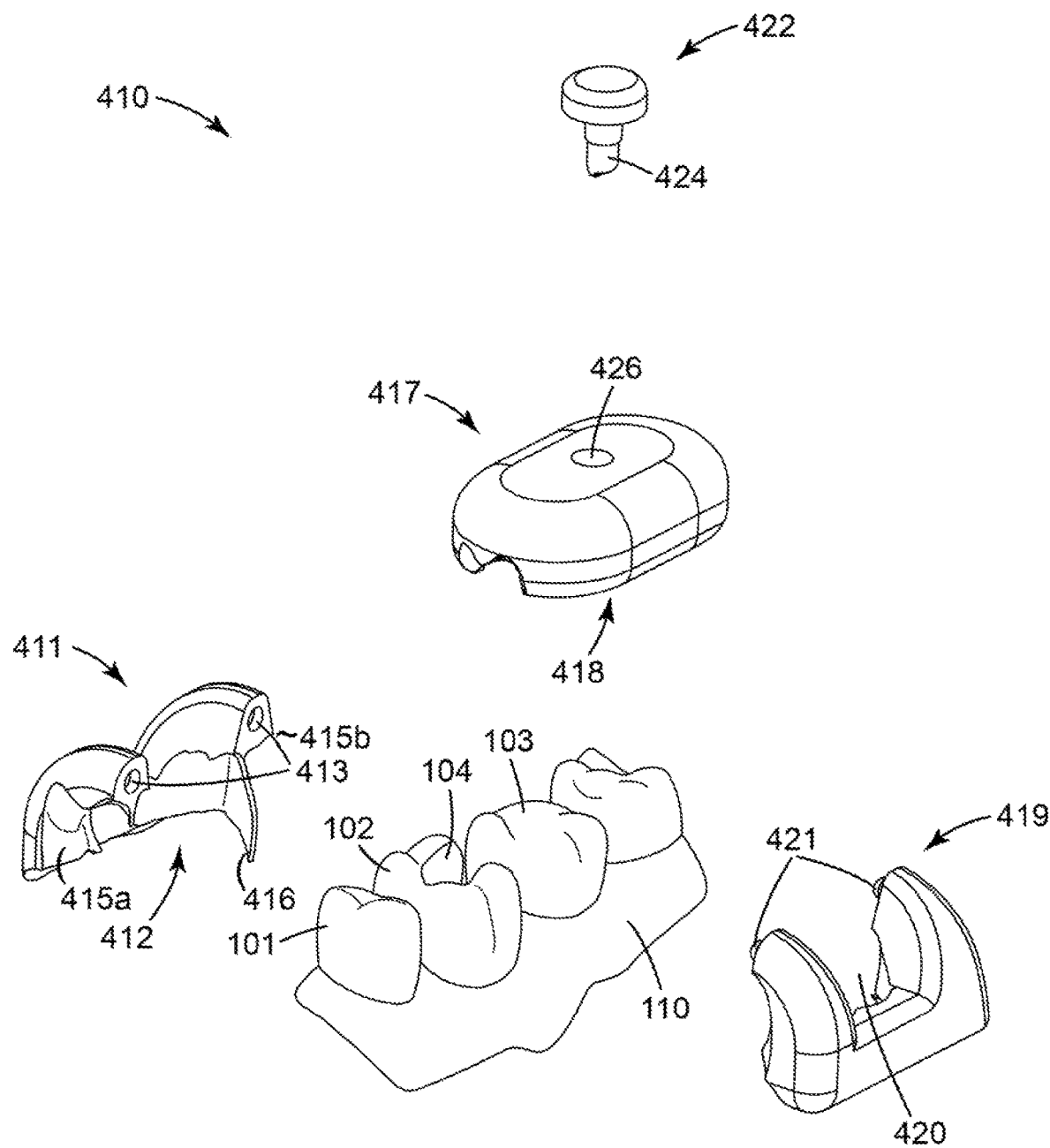
FIG. 14 illustrates a custom tool for forming dental restorations of a tooth in a mouth of a patient, the custom tool including a mold body with an interproximal portion corresponding with an interproximal surface of a tooth.

FIG. 14 illustrates custom tool 410 for forming a dental restorations of a single tooth 102 in a mouth of a patient. Custom tool 410 is an alternative to custom tool 10, which is instead configured to facilitate dental restorations of two adjacent teeth. For brevity, as a variety of elements of custom tool 410 are substantially similar to those of custom tool 10, such elements are described in limited or no detail with respect to custom tool 410.

Custom tool 410 includes a unitary mold body component 411, which includes single mold body 412 with interproximal portion 416. Mold body 412 provides a customized fit with tooth 102. In addition, interproximal portion 416 of mold body 412 corresponds to an interproximal surface of tooth 102 to also provide a customized fit with tooth 102. Interproximal portion 416 is of unitary construction in that custom tool 410 does not include any seams within its components within the interproximal spaces corresponding to interproximal portion 416. For example, interproximal portion 416 may extend entirely through the interproximal space between tooth 102 and adjacent tooth 103.

Following molding of restorative dental material using mold body 412, because interproximal portion 416 of mold body 412 extend through the interproximal space, the occurrence of raised seams or flashing from restorative dental material within the interproximal spaces should be limited as compared to molds in which seams between mold components exist within the interproximal spaces. As material may be difficult to remove from within interproximal portion 416, the design of custom tool 410 may simplify and improve dental restoration molding techniques as compared to molds in which seams between mold components exist within the interproximal spaces. Further, integration of the interproximal portion, 16 with the mold body component 411 permits fast and easy placement while assuring precise alignment of the components is maintained, which may simplify dental restorations as compared to conventional multi-piece matrix systems.

Custom tool 410 further includes optional support body component 419. Support body component 419 includes support body 420, which is engageable with, and provides support for, mold body 412 via snap fit connections. For example, support body 420 may not provide any portion of the mold cavities, but may instead simply help secure mold body component 411 including mold body 412 in place. Support body 420 includes snap fit elements 421 that mate with corresponding snap fit elements 413 of mold body 412. While support body 420 are described as not forming any portion of mold cavity, in other examples, the support body 420 may be readily modified to combine with mold body 412 to form one or more mold cavities. In such examples, the modified support body 420 should also be considered a mold body.

Mold body component 411 includes optional customized surface 415a, which provides a customized fit with tooth 101 and optional customized surface 415b, which provides a customized fit with tooth 103. Customized surfaces 415a, 415b may further secure and register mold body 412 in place within a patient's mouth to facilitate precise customized dental restorations of tooth 102. Mold body component 411 may further register with gingiva 110 of the patient. Like mold body component 411, support body component 419 may include surfaces that register with the teeth of the patient, as well as gingiva 110 of the patient. In addition, one or more of customized surfaces 415a, 415b may be configured to register with a restored surface of an adjacent tooth, 101, 103. For example, tooth 101 may have been restored prior to the restoration of tooth 102, but after the collection of scan data including teeth 101, 102, 103. In such an example, customized surface 415a may be designed to conform to the restored surface of tooth 101 to facilitate iterative restoration of tooth 102 after the restoration of tooth 101. Further, this concept of registering subsequent mold bodies to one another may be extended to additional iterations, such that tooth 103 may be restored after tooth 102. Such iterative restoration may extend up to an entire dental arch may be restored via a series of self-registering mold bodies, either designed to register with a surface of an adjacent tooth according to scan data or designed to register with surfaces of a restored tooth. Further it is not necessary for the iterative restoration to be completed in order along the arch, but may instead be designed according to a different defined sequence, such as first restoring teeth needing the most significant repair. The iterative repairs should then be performed in the order defined by the design of the customized surfaces, such as customized surfaces 415a, 415b. Such iterative repair techniques may include any combination or variations of custom tool 10, custom tool 210, custom tool 410 or other custom tools.

Optionally, mold body 412 and/or support body component 419 may be further configured to provide features, including customized gingival surfaces representing an isolation matrix for a dental restoration. In this manner, mold body 412 may contain features that extend subgingivally or into hidden interproximal space. The customized fit of mold body 412 may further serve to isolate tooth 102 from blood, gingival crevicular fluid, or saliva during a dental restoration material.

In this manner, mold body 412 and support body 420 may provide multiple customized surfaces that mate with corresponding surfaces of teeth 101, 102, 103 as well as gingiva 110 of the patient. The combination of mold body component 411 and support body component 419 provides a secure fit within the mouth of the patient to precisely align mold body 412 with tooth 102 in order to facilitate dental restorations of tooth 102. Custom tool 410 further includes occlusal portion 417 and press 422. Occlusal portion 417 provides customized occlusal surface 418, corresponding to occlusal surfaces of tooth 102. Occlusal portion 417 includes injection port 426 for delivery of restorative dental material to mold cavities adjacent occlusal surface 418.

Following the injection of restorative dental material into the mold cavities adjacent occlusal surface 418, press 422 may be positioned such that plugs is positioned within port 426, respectively. Occlusal portion 417 further may further include includes vent holes (not shown) to allow air and excess dental material to escape the mold cavities as material is injected via fill port 426 and as press 422 is positioned such that such that plug 424 fills port 26.

Custom tool 410 combines with tooth 102 to form a single mold cavity of mold body 412, which encompasses the entire missing tooth structure of tooth 102. By positioning mold body component 411 over tooth 102, restorative dental material may be positioned into the mold cavities and take the form of the missing tooth structure of cavity 104. Repair of tooth 102 occurs by filling the mold cavity with dental restoration material after positioning mold body 412 to register with tooth 102. Optionally, the filling material may be applied to the tooth and/or mold cavity prior to positioning mold body 412 to register with tooth 102. In such examples, the process of seating the mold body shapes the restorative material into the desired shape. The missing tooth structure may include any portion of tooth 102, including any combination of interproximal, occlusal, facial and/or lingual tooth structure. An inner surface of mold body 412 each include a portion of a mold cavity corresponding with at least one exterior surface of the corresponding tooth 102, the at least exterior surface may include facial, lingual, interproximal and/or occlusal surfaces of the corresponding tooth 102. In some examples, the mold cavities may facilitate dental veneer restoration of facial, lingual, interproximal and/or occlusal surfaces of the corresponding tooth 102.

In some examples, the mold cavity of mold body 412 may encompass the entirety of the missing tooth structure of tooth 102. In other examples, the mold cavity of mold body 412 may encompass less than the entirety of the missing tooth structure of tooth 102, such that further dental restoration steps may occur following the filling of the mold cavities mold body 412, e.g., as shown in FIG. 6B.

Various examples have been described. Modifications to the described examples may be made within the spirit of this disclosure. For example, custom tools can be fabricated off of initial tooth geometry or digitally optimized tooth geometry (e.g. hole filling close gaps in the data, pulling and scaling data from tooth libraries, testing in a virtual articulator). Tools can fit precisely to the existing structure or can be optimized to selectively move or position tissue. Custom tools can be formed without prior information of the where the tooth structure will be removed, such as when the extent of caries is not known. Custom tools may be formed to generate a digitally optimized tooth structure that will require the practitioner to remove tooth structure prior to application of the tool. Tools can be printed or milled. Tools can be made from the full range of 3D printed materials (strength, flexibility, translucency, color). Tools can be coated with a range of agents to optimize release, surface finish and optical transparency. Tools can contain features to indicate or define fill level of different restorative materials (shade, fill level, physical properties). Physical characteristics (elasticity, roughness, transparency, etc) of tools can vary across the tool to sealing capability, dimensional fidelity, texture imparted to restorative material, degree of cure of material, etc). Tools/mold sections can interlock with each other or with standard components (e.g. matrix bands). Tools can be used inside or outside of the mouth. Restorative material can be injected through ports in tools, applied to tooth structure and/or tool prior to the application of the tool, such that application shapes the material. Tools can be degradable (e.g. solvent/heat) to release from the restorative material or enable undercut geometries/reduce parting lines. Tools could be collapsible (deflated, frangible, etc.) Kits can be created of the patient specific tools and associated products and quantities, (e.g. adhesives, filling, and polishing materials selected for the patient needs and/or doctor preferences). Series of tools used sequentially in the direct filling process in order to control the geometries of multiple layers of a dental restoration on a tooth. Dental scans may be taken at diagnostic appointment to facilitate custom tools fabrication prior to a dental restoration appointment. Tools may be manufactured locally or digital scan data may be sent to a remote location for production.

These and other examples are within the scope of the following claims.

What is claimed is:

1. A custom tool for forming a dental restoration in a mouth of a patient, the custom tool comprising:
   a first mold body providing for a customized fit with at least one tooth of the patient, wherein the first mold body includes a portion corresponding with at least a first surface of the tooth and an interproximal portion corresponding with an interproximal surface of the tooth,
   wherein the first mold body is configured to combine with the tooth of the patient to form a mold cavity encompassing a portion of missing tooth structure of the tooth; and
   wherein the interproximal portion extends entirely through an interproximal space between the tooth receiving dental restoration material and an adjacent tooth;
   a second mold body providing for a customized fit with the at least one tooth of the patient, wherein the second mold body includes a portion corresponding with a second surface of the tooth,
   wherein the second mold body is configured to combine with the first mold body and the tooth of the patient to form the mold cavity encompassing the portion of missing tooth structure of the tooth.

2. The custom tool of claim 1, wherein the portion of the missing tooth structure includes missing interproximal tooth structure.

3. The custom tool of claim 1, wherein the first mold body isolates the tooth receiving the restoration from blood or saliva.

4. The custom tool of claim 1,
   wherein the mold cavity is a first mold cavity, the first mold cavity representing a first portion of missing tooth structure of the at least one tooth,
   wherein the second mold body is configured to combine with dental restoration material molded within the first mold cavity to form a second mold cavity, the second mold cavity representing additional missing tooth structure of the at least one tooth,
   wherein the first mold cavity and the second mold cavity facilitate iterative repair of the first portion of missing tooth structure of the at least one tooth and additional missing tooth structure of the at least one tooth.

5. The custom tool of claim 4, wherein the second mold body registers with repaired portions of the at least one tooth such that the second mold body provides a customized fit with the dental restoration material molded within the first mold cavity.

6. The custom tool of claim 4, further comprising dental restoration material within the first mold cavity and dental restoration material within the second mold cavity, wherein the dental restoration material within the first mold cavity and the second mold cavity provide the entire missing structure.

7. The custom tool of claim 1, wherein the mold cavity forms an inner surface corresponding to an outer surface of the tooth prior to restoration.

8. The custom tool of claim 1, further comprising:
   dental restoration material in the mold cavity to form a first partial dental restoration; and
   additional dental restoration material in the mold cavity to form a second partial dental restoration,
   wherein a mold line between the first partial dental restoration and second partial dental restoration is located outside the interproximal space between the at least one tooth and the adjacent tooth.

9. The custom tool of claim 1, wherein the dental restoration provides a dental veneer restoration on the at least one tooth.

10. The custom tool of claim 1, wherein an occlusal surface of the mold cavity is occlusal to the interproximal portion between the at least one tooth and the adjacent tooth.

11. The custom tool of claim 1, wherein the first mold body is formed based on three-dimensional scan data of the mouth of the patient.

12. The custom tool of claim 1, wherein the first mold body is manufactured by three-dimensional printing.

13. The custom tool of claim 1, wherein the first mold body is manufactured by CAD/CAM milling processes.

14. The custom tool of claim 1, wherein the first mold body includes a first gingival surface, and wherein the custom tool retracts the gingiva from the tooth for a restoration of the tooth.

15. The custom tool of claim 1, wherein the interproximal portion is of unitary or seamless construction.

16. A custom tool for forming a dental restoration in a mouth of a patient, the custom tool comprising:
   a first mold body providing for a customized fit with at least one tooth of the patient, wherein the first mold body includes a portion corresponding with at least a first surface of the tooth and an interproximal portion corresponding with an interproximal surface of the tooth; and
   a second mold body providing for a customized fit with the at least one tooth of the patient, wherein the second mold body includes a portion corresponding with a second surface of the tooth;
   wherein the first mold body is configured to combine with the tooth of the patient to form a mold cavity encompassing a portion of missing tooth structure of the tooth;
   wherein the second mold body is separable from and engageable with the first mold body and the tooth of the patient to form the mold cavity encompassing the portion of missing tooth structure of the tooth; and wherein the interproximal portion extends entirely through an interproximal space between the tooth receiving dental restoration material and an adjacent tooth.

17. The custom tool of claim 16, further comprising a support body providing for a customized fit with the at least one tooth of the patient, wherein the support body provides support to the first mold body and the second mold body.

18. The custom tool of claim 16, wherein the first surface of the tooth is a facial surface of the tooth and the second surface of the tooth is an occlusal surface of the tooth.

19. The custom tool of claim 16, wherein the first surface of the tooth is a lingual surface of the tooth and the second surface of the tooth is an occlusal surface of the tooth.

20. The custom tool of claim 16, wherein the first surface of the tooth is a facial surface of the tooth and the second surface of the tooth is a lingual surface of the tooth.

21. The custom tool of claim 16, further comprising:
a third mold body providing for a customized fit with the at least one tooth of the patient, wherein the third mold body includes a portion corresponding with a third surface of the tooth,
wherein the third mold body is configured to combine with the first and second mold bodies and the tooth of the patient to form the mold cavity encompassing the portion of missing tooth structure of the tooth; and
a support body providing for a customized fit with the at least one tooth of the patent,
wherein the support body provides support to the first mold body and the third mold body, and is separable from and engageable with the first mold body and the third mold body.

22. The custom tool of claim 16,
wherein the mold cavity is a first mold cavity, the custom tool further comprising a third mold body providing for a customized fit with the adjacent tooth of the patient configured to receive dental restoration material along with the at least one tooth,
wherein the third mold body includes a portion corresponding with a first surface of the adjacent tooth, and
wherein the third mold body is configured to combine with the adjacent tooth to form a second mold cavity encompassing a portion of missing tooth structure of the adjacent tooth.

23. The custom tool of claim 22,
wherein the second mold body further includes a customized fit with the adjacent tooth of the patient,
wherein the second mold body includes a portion corresponding with a second surface of the adjacent tooth,
wherein the second mold body is configured to combine with the third mold body and the adjacent tooth of the patient to form the second mold cavity.

24. The custom tool of claim 22, wherein the second mold body is separable from and engageable with the first mold body and the third mold body.

25. The custom tool of claim 22, further comprising a support body providing for a customized fit with the at least one tooth of the patient,
wherein the support body provides support to the first mold body and the third mold body, and is separable from and engageable with the first mold body and the third mold body.

26. The custom tool of claim 22, wherein the third mold body includes a portion corresponding with a surface of the adjacent tooth and corresponding with a surface of the at least one tooth.

27. The custom tool of claim 16, wherein a portion of the second mold body overlaps with a portion of the first mold body, and wherein the first mold body and the second mold body each encompass at least part of the portion of the missing tooth structure.

28. A custom tool for forming a dental restoration in a mouth of a patient, the custom tool comprising:
a first mold body providing for a customized fit with at least one tooth of the patient, wherein the first mold body includes a portion corresponding with at least a first surface of the tooth and an interproximal portion corresponding with an interproximal surface of the tooth wherein the first mold body is configured to combine with the tooth of the patient to form a mold cavity encompassing a portion of missing tooth structure of the tooth,
a second mold body providing for a customized fit with the at least one tooth of the patient, wherein the second mold body includes a portion corresponding with a second surface of the tooth,
wherein the second mold body is configured to combine with the first mold body and the tooth of the patient to form the mold cavity encompassing the portion of missing tooth structure of the tooth,
wherein the interproximal portion extends entirely through an interproximal space between the tooth receiving dental restoration material and an adjacent tooth,
wherein the interproximal portion is of unitary or seamless construction.

29. A custom tool for forming a dental restoration in a mouth of a patient the custom tool comprising:
a first mold body providing for a customized fit with at least one tooth of the patient, wherein the first mold body includes a portion corresponding with at least a first surface of the tooth and an interproximal portion corresponding with an interproximal surface of the tooth,
wherein the first mold body is configured to combine with the tooth of the patient to form a mold cavity encompassing a portion of missing tooth structure of the tooth;
a second mold body providing for a customized fit with the at least one tooth of the patient, wherein the second mold body includes a portion corresponding with a second surface of the tooth,
wherein the second mold body is separable from and engageable with the first mold body and the tooth of the patient to form the mold cavity encompassing the portion of missing tooth structure of the tooth;
a port defined by at least one of the first mold body or the second mold body; and
a plug receivable in the port, wherein the plug includes a tip surface corresponding to a surface of the tooth, and wherein a dental restoration material may be injected into the mold cavity through the port.

30. The custom tool of claim 29, further comprising a support body providing for fit with the at least one tooth of the patient, wherein the support body provides support to the first mold body and the second mold body.

31. The custom tool of claim 29, wherein the first surface of the tooth is a facial surface of the tooth and the second surface of the tooth is an occlusal surface of the tooth.

32. The custom tool of claim 29, wherein the first surface of the tooth is a lingual surface of the tooth and the second surface of the tooth is an occlusal surface of the tooth.

33. The custom tool of claim 29, wherein the first surface of the tooth is an interproximal surface of the tooth and the second surface of the tooth is an occlusal surface of the tooth.

34. The custom tool of claim 29, wherein the mold cavity forms an inner surface corresponding to the tooth's outer surface prior to restoration.

35. The custom tool of claim 29, wherein a portion of the second mold body overlaps with a portion of the first mold body, and wherein the first and second mold body each encompass a first portion of the missing tooth structure.

36. The custom tool of claim 29, wherein the mold bodies are formed based on three-dimensional scan data of the mouth of the patient.

37. The custom tool of claim 29, wherein the first mold body is manufactured by three-dimensional printing.

38. The custom tool of claim 29, wherein the first mold body is manufactured by CAD/CAM milling processes.

\* \* \* \* \*